United States Patent
Yeo et al.

(10) Patent No.: US 11,520,097 B2
(45) Date of Patent: Dec. 6, 2022

(54) SINGLE EDGE LIT LIGHTING MODULE AND LIGHT FIXTURE PRODUCING TAILORED LIGHT DISTRIBUTIONS

(71) Applicants: Fusion Optix, Inc., Woburn, MA (US); Axis Lighting, Inc., LaSalle (CA)

(72) Inventors: Terence Yeo, Boston, MA (US); Timothy Kelly, Brookline, MA (US); Howard Yaphe, Saint-Laurent (CA); Stephane Beland, Saint-Jean-sur-Richelieu (CA); Jean Gagne, Saint-Lazare (CA); Andrew Miles, Cornwall (CA)

(73) Assignees: Fusion Optix, Inc., Woburn, MA (US); Axis Lighting, Inc., La Salle (CA)

( * ) Notice: Subject to any disclaimer, the term of this patent is extended or adjusted under 35 U.S.C. 154(b) by 0 days.

(21) Appl. No.: 17/501,840

(22) Filed: Oct. 14, 2021

(65) Prior Publication Data

US 2022/0107454 A1 Apr. 7, 2022

Related U.S. Application Data

(63) Continuation-in-part of application No. 15/887,801, filed on Feb. 2, 2018, now Pat. No. 11,156,762.

(Continued)

(51) Int. Cl.
*G02B 6/00* (2006.01)
*F21V 8/00* (2006.01)

(52) U.S. Cl.
CPC ......... *G02B 6/0016* (2013.01); *G02B 6/0055* (2013.01); *G02B 6/0073* (2013.01)

(58) Field of Classification Search
CPC .. G02B 6/0073; G02B 6/0031; G02B 6/0016; G02B 6/0055; G02B 6/004;
(Continued)

(56) References Cited

U.S. PATENT DOCUMENTS

| 7,665,865 B1 * | 2/2010 | Hulse | F21K 9/64 362/277 |
| 7,991,257 B1 * | 8/2011 | Coleman | G02B 6/0036 264/494 |

(Continued)

*Primary Examiner* — Gerald J Sufleta, II

(57) ABSTRACT

A single edge lit lighting module produces bi-lobed light distributions which provide targeted control of light output with peak intensity that is non-normal to the lighting module output face. The compact form factor of module embodiments having narrow width are particularly well-suited for use in linear lighting fixtures for suspended, surface and recessed lighting configurations typically used to illuminate walls, floors and/or ceilings. Embodiments of the single edge lit lighting module utilize reflectors in combination with light guides having volumetric light scattering properties and surface features to control peak intensities, output angles, and shapes of the two light output lobes. A variety of light distributions can be achieved including symmetrical bi-lobed distributions conventionally achieved by double edge lit modules. Further embodiments utilize selective alignment of light guide with reflector to achieve different asymmetric light distributions. The single edge lit lighting module incorporates a housing, LED board, light guide and reflector, and can further incorporate an optically transmitting lens over its output face and provides a fixture assembler with a range of design choices without need of additional components.

64 Claims, 20 Drawing Sheets

Related U.S. Application Data

(60) Provisional application No. 62/453,588, filed on Feb. 2, 2017.

(58) Field of Classification Search
CPC .... G02B 6/0041; G02B 6/0043; G02B 6/009; G02B 6/0091; G02B 6/0086; F21V 7/04
See application file for complete search history.

(56) References Cited

U.S. PATENT DOCUMENTS

| | | | | |
|---|---|---|---|---|
| 8,033,706 | B1* | 10/2011 | Kelly | G02B 6/0043 362/617 |
| 8,430,548 | B1* | 4/2013 | Kelly | G02B 6/0051 362/613 |
| 8,953,926 | B1* | 2/2015 | Kelly | F21V 7/04 362/628 |
| 10,436,969 | B2* | 10/2019 | Yuan | F21K 9/61 |
| 2003/0210222 | A1* | 11/2003 | Ogiwara | G02B 6/0061 345/103 |
| 2006/0227546 | A1* | 10/2006 | Yeo | G02B 5/0284 362/227 |
| 2008/0266879 | A1* | 10/2008 | Chang | G02B 6/0021 362/330 |
| 2008/0278943 | A1* | 11/2008 | Van Der Poel | F21V 11/06 362/240 |
| 2012/0163024 | A1* | 6/2012 | Edamitsu | F21V 5/02 362/611 |
| 2012/0236595 | A1* | 9/2012 | Parker | F21V 9/40 362/609 |
| 2012/0287674 | A1* | 11/2012 | Nichol | G02B 6/0018 264/1.24 |
| 2013/0181246 | A1* | 7/2013 | Wu | F21V 7/28 438/27 |
| 2013/0208495 | A1* | 8/2013 | Dau | G02B 6/0078 362/551 |
| 2013/0258709 | A1* | 10/2013 | Thompson | G02B 6/0023 362/608 |
| 2014/0126236 | A1* | 5/2014 | Song | G02B 6/0041 362/607 |
| 2014/0211495 | A1* | 7/2014 | Yuan | G02B 6/0035 362/555 |
| 2015/0029717 | A1* | 1/2015 | Shen | F21V 3/049 362/297 |
| 2015/0049511 | A1* | 2/2015 | Tarsa | G02B 6/003 362/611 |
| 2015/0177439 | A1* | 6/2015 | Durkee | G02B 6/0063 362/555 |
| 2016/0047969 | A1* | 2/2016 | Lim | G02B 6/0038 362/619 |
| 2016/0329020 | A1* | 11/2016 | Ma | G02B 6/0036 |
| 2017/0097448 | A1* | 4/2017 | Wang | F21V 13/04 |
| 2017/0123134 | A1* | 5/2017 | Moon | G02B 6/0061 |
| 2017/0153007 | A1* | 6/2017 | Banin | F21V 11/00 |
| 2018/0188442 | A1* | 7/2018 | Wang | G02B 6/00 |
| 2018/0231708 | A1* | 8/2018 | Liu | G02B 6/0065 |
| 2018/0267228 | A1* | 9/2018 | Epstein | G02B 6/0036 |
| 2018/0284339 | A1* | 10/2018 | Isbrucker | G02B 6/0018 |
| 2018/0329129 | A1* | 11/2018 | Tjin | G02B 6/003 |
| 2019/0041318 | A1* | 2/2019 | Wissmann | G01N 21/31 |

* cited by examiner

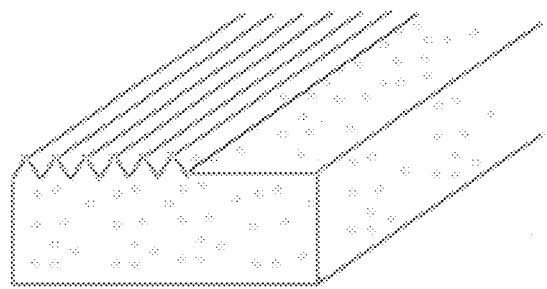
(i) Diffuse Partial Lenticular
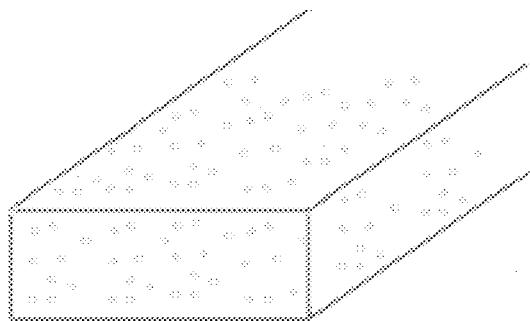
(ii) Diffuse Planar
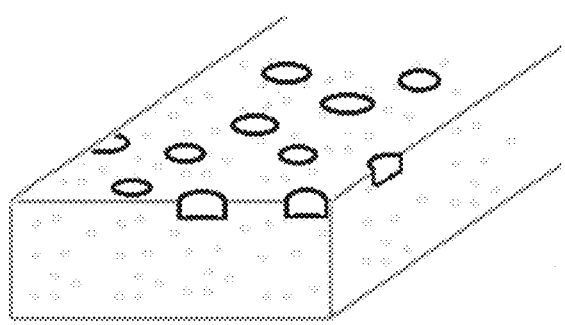
(iii) Diffuse Laser Etched
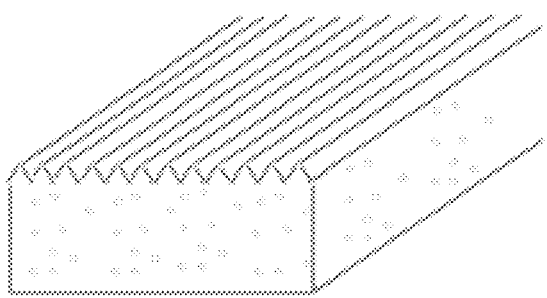
(iv) Diffuse Prism Lenticular
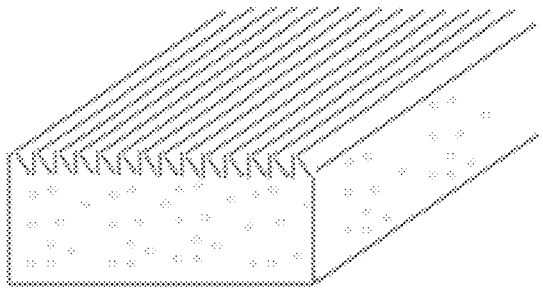
(v) Diffuse Sawtooth
Fig. 2B

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| A1 | Surface Features on Outer Face | 4.5 | 18 | M1000 lenticular (Fig. 5) | 2% | Specular |
| A2 | Surface Features on Inner Face | 4.5 | 18 | M1000 lenticular (Fig. 5) | 2% | Specular |
| B1 | Surface Features on Outer Face | 4.5 | 18 | M1000 lenticular (Fig. 5) | 2% | Specular |
| B2 | Surface Features on Inner Face | 4.5 | 18 | M1000 lenticular (Fig. 5) | 2% | Specular |
| C2% | Surface Features on Inner Face | 4.5 | 18 | M1000 lenticular (Fig. 5) | 2% | Specular |
| C5% | Surface Features on Inner Face | 4.5 | 18 | M1000 lenticular (Fig. 5) | 5% | Specular |
| C10% | Surface Features on Inner Face | 4.5 | 18 | M1000 lenticular (Fig. 5) | 10% | Specular |
| C20% | Surface Features on Inner Face | 4.5 | 18 | M1000 lenticular (Fig. 5) | 20% | Specular |
| D | Surface Features on Inner Face | 4.5 | 15 | M1000 lenticular (Fig. 5) | 5% | Specular |

Fig. 3A

| Embodiment | Light Guide Orientation | Light Guide Height (mm) | Light Guide Width (mm) | Light Guide Surface Feature | Bulk Diffusion Concentration | Reflector |
|---|---|---|---|---|---|---|
| E1 | Surface Features on outer face (Fig. 14) | 4.5 | 18 | 12-6 pattern (Fig 6 Embodiment E) | 0% | Specular |
| | | | | | 2% | |
| E2 | Surface Features on inner face (Fig. 15) | | | | 5% | |
| | | | | | 8% | |
| F1 | Surface Features on Outer Face (Fig. 16) | | | 6-12 pattern (Fig 6 Embodiment F) | 0% | |
| F2 | Surface Features on Inner Face (Fig. 17) | | | | 2% | |
| | | | | | 5% | |
| | | | | | 8% | |
| G10% | Surface on Inner Face | | | NO FEATURES | 10% | Specular |
| G10% Etched | Surface on Inner Face | | | ETCHED LIGHT GUIDE | 10% | Specular |

Fig. 3B

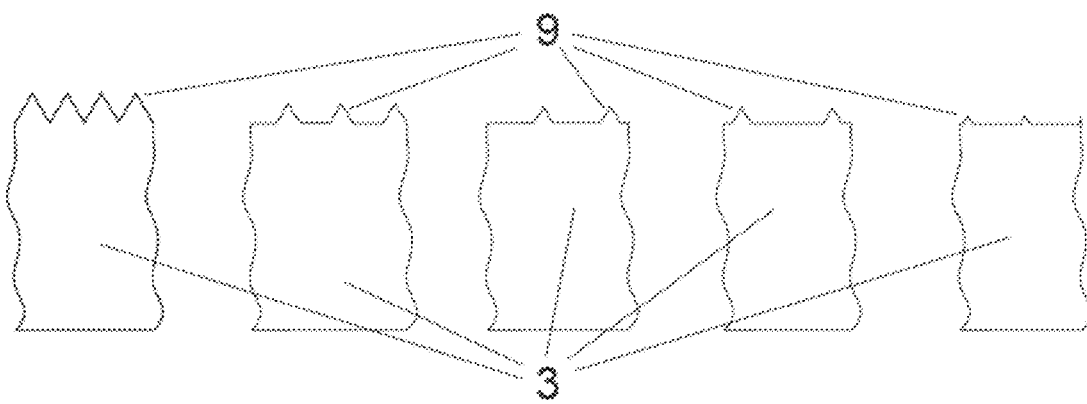
Fig. 4
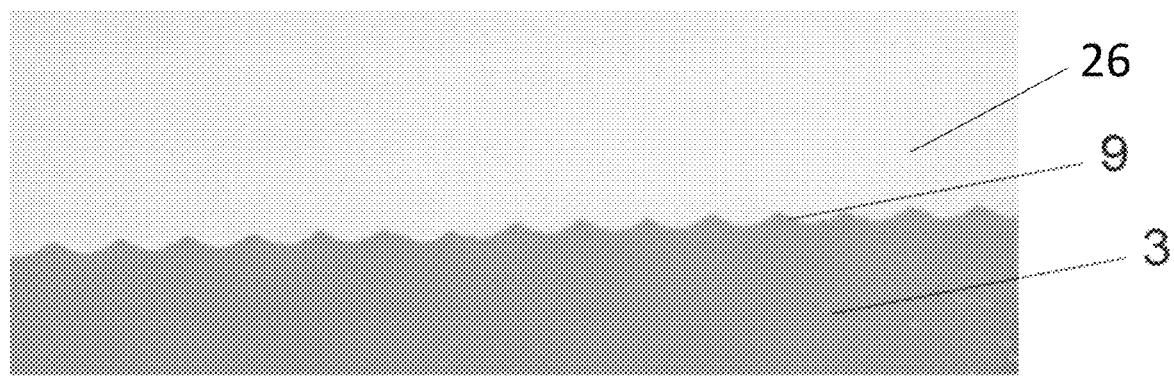
Fig. 5
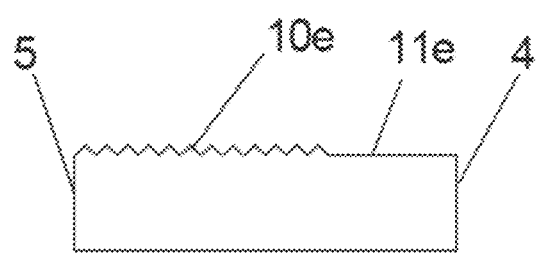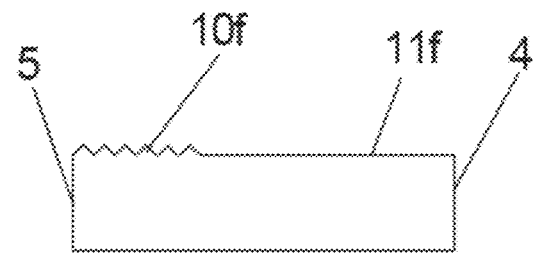
Fig. 6

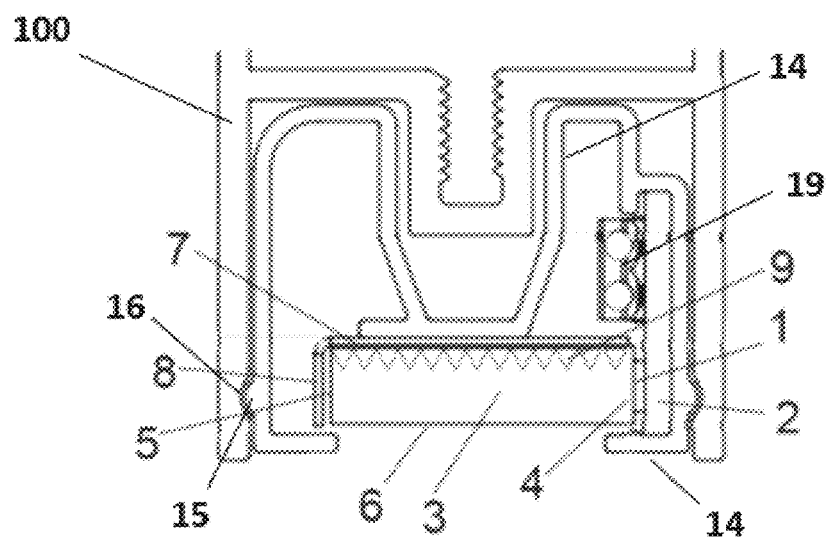
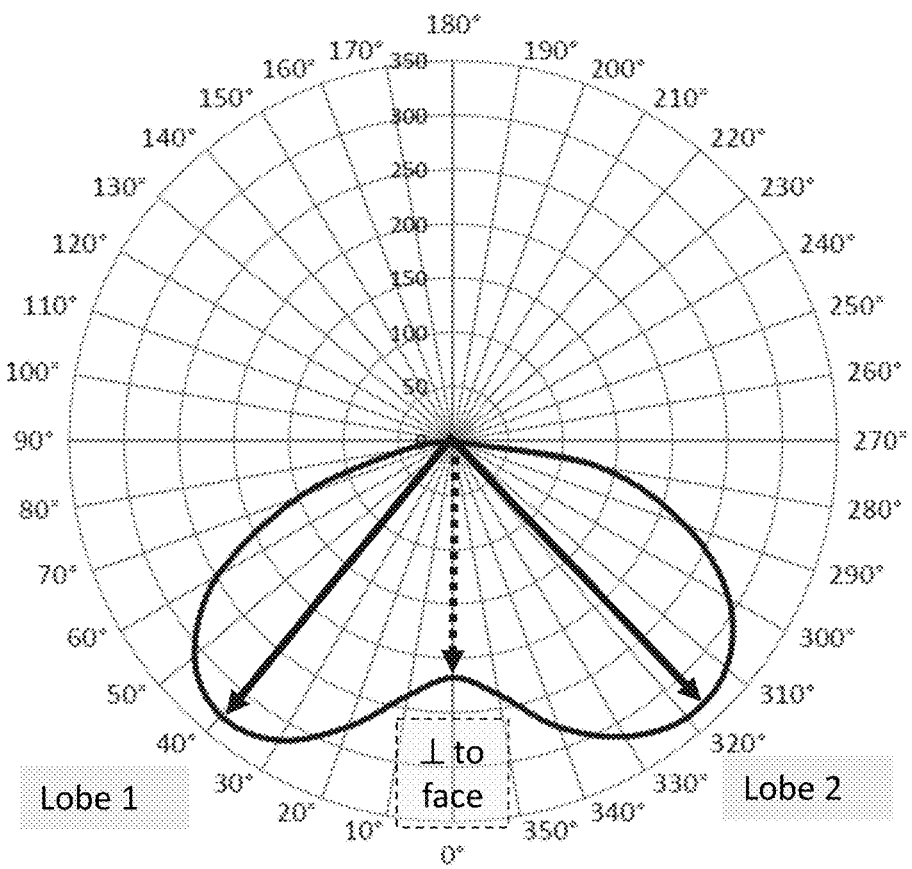
Fig. 12

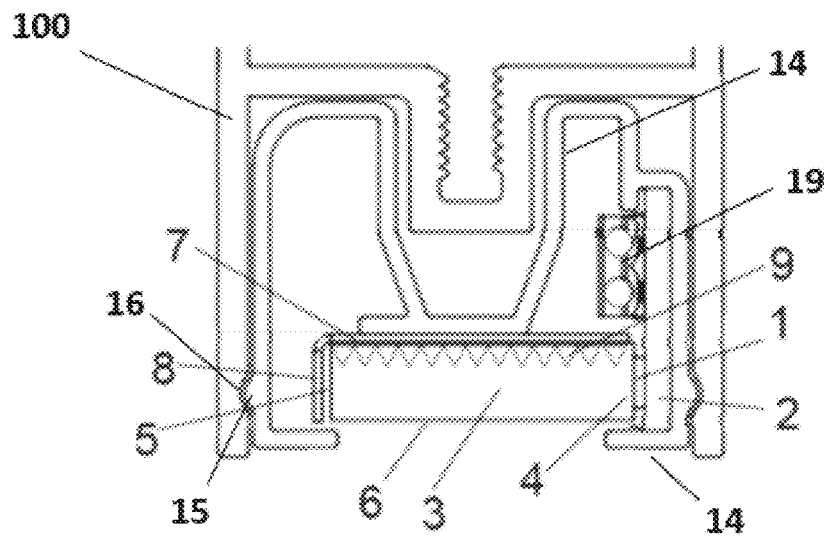
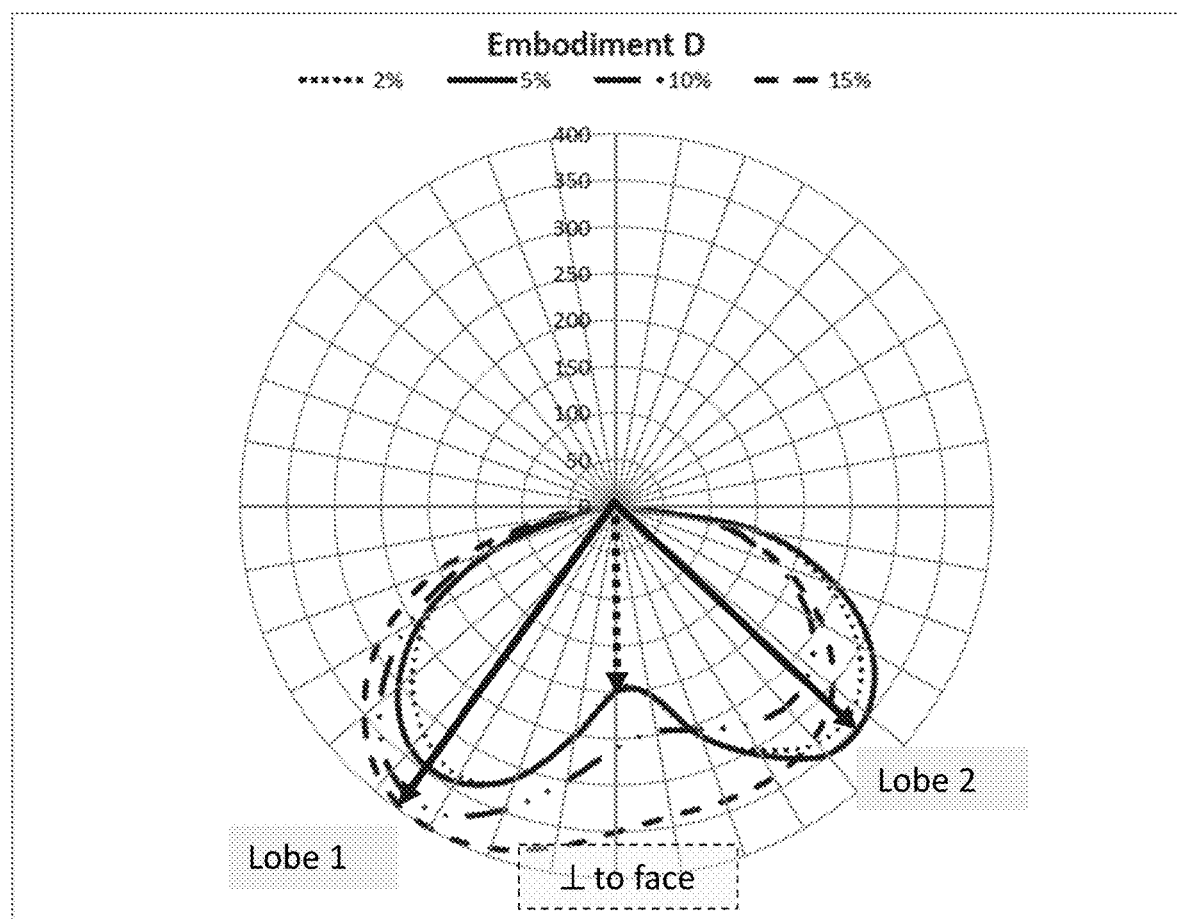
Fig. 13

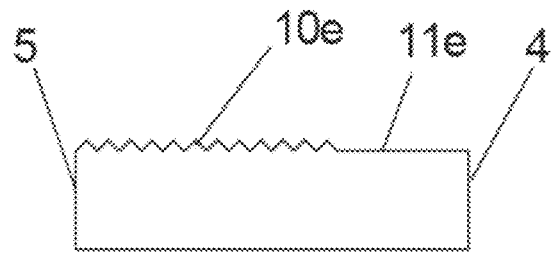
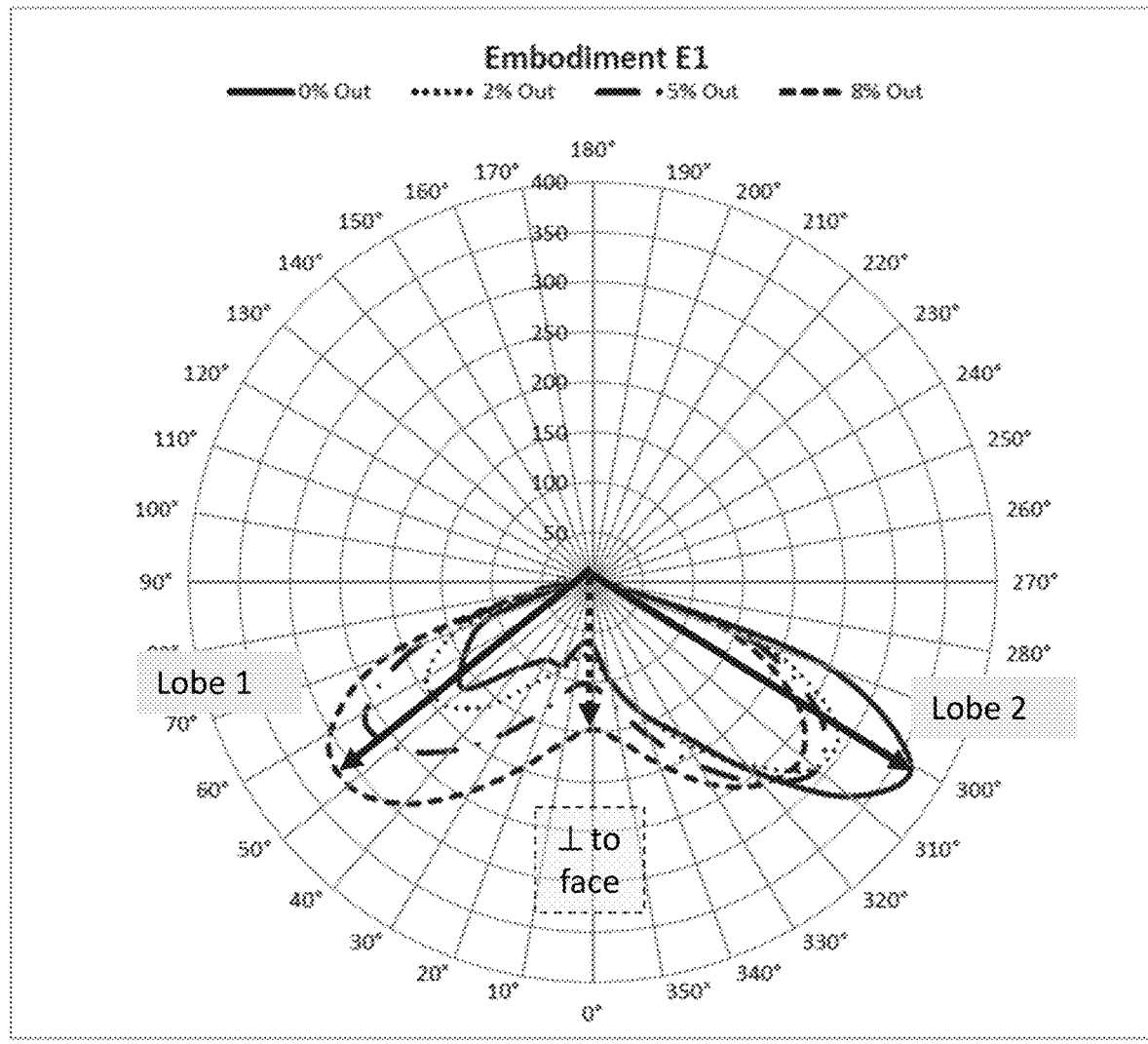
Fig. 14

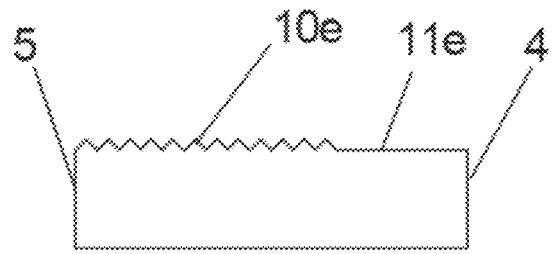
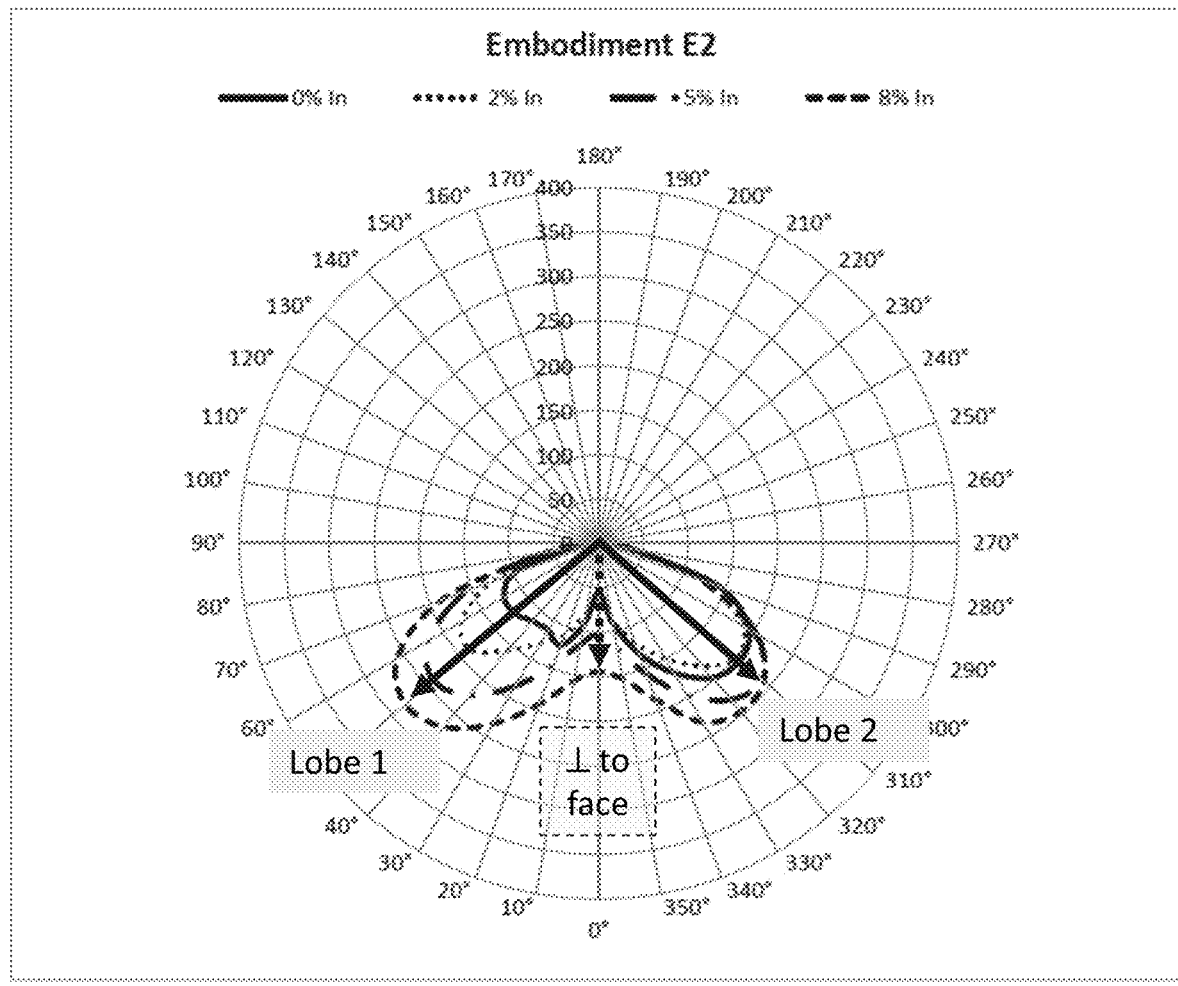
Fig. 15

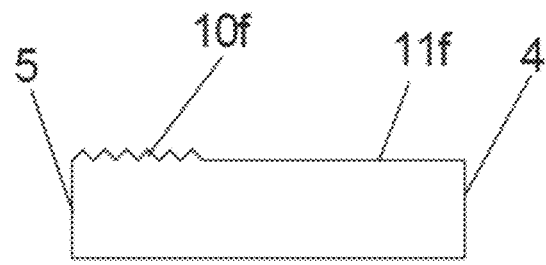
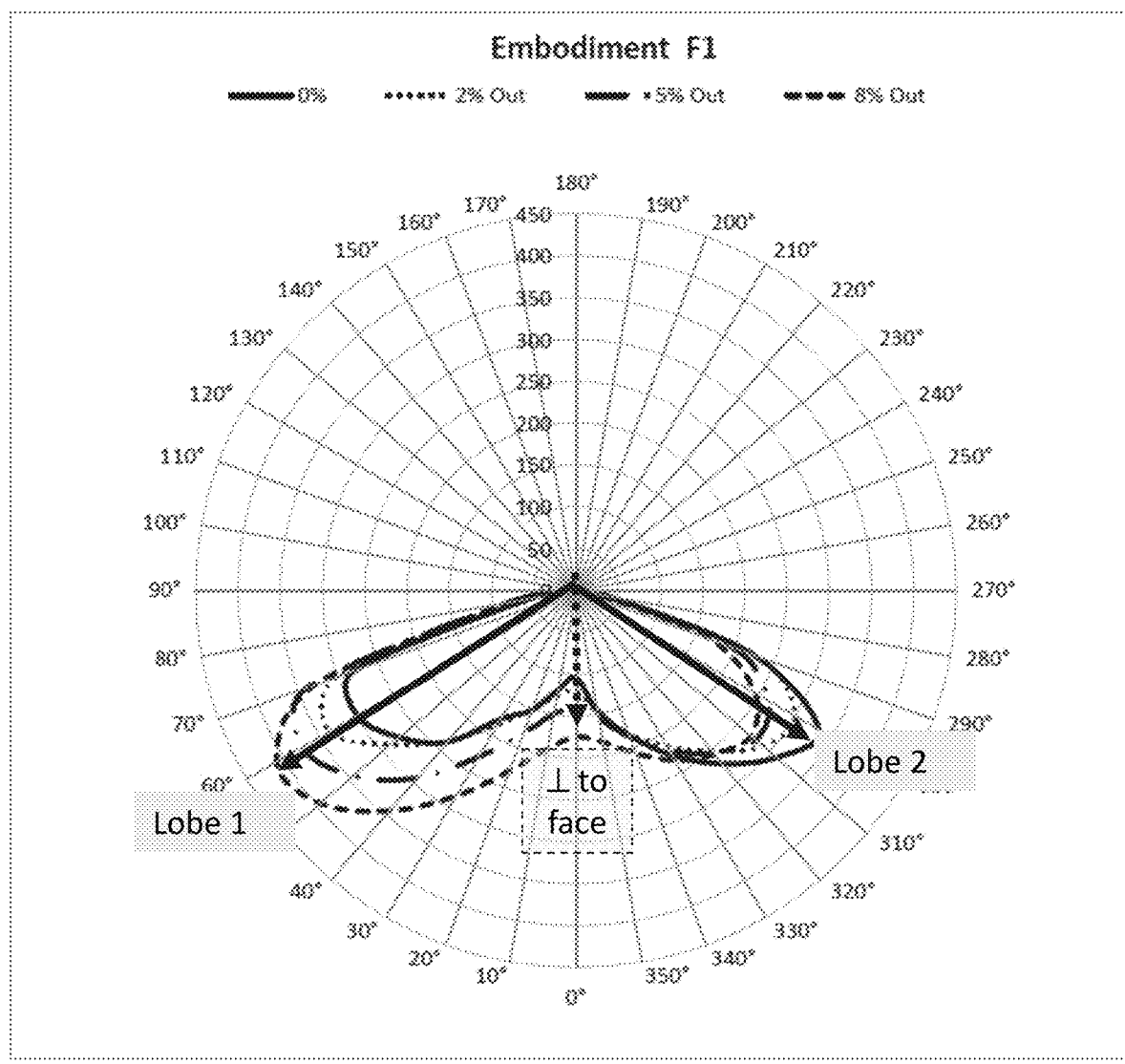
Fig. 16

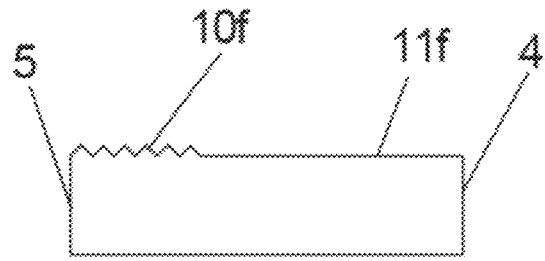
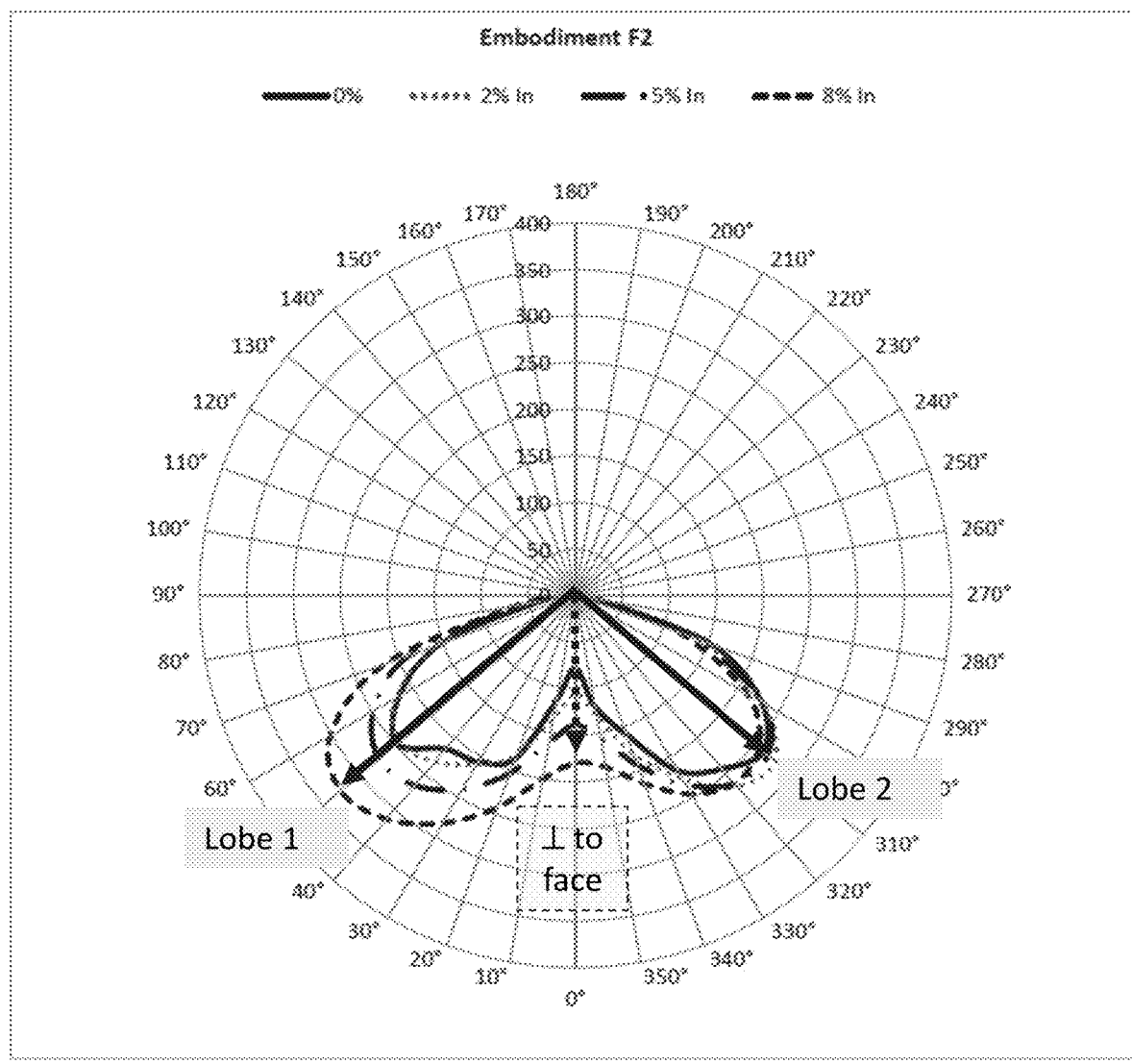
Fig. 17

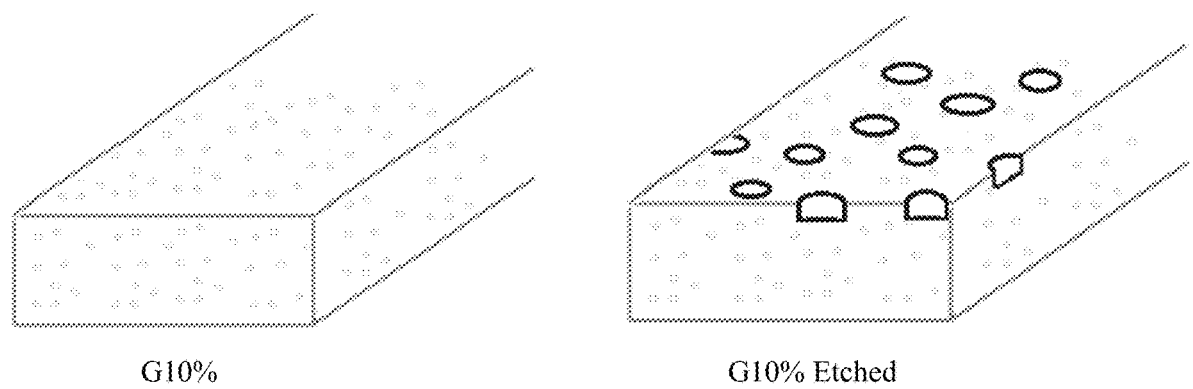
G10%                  G10% Etched
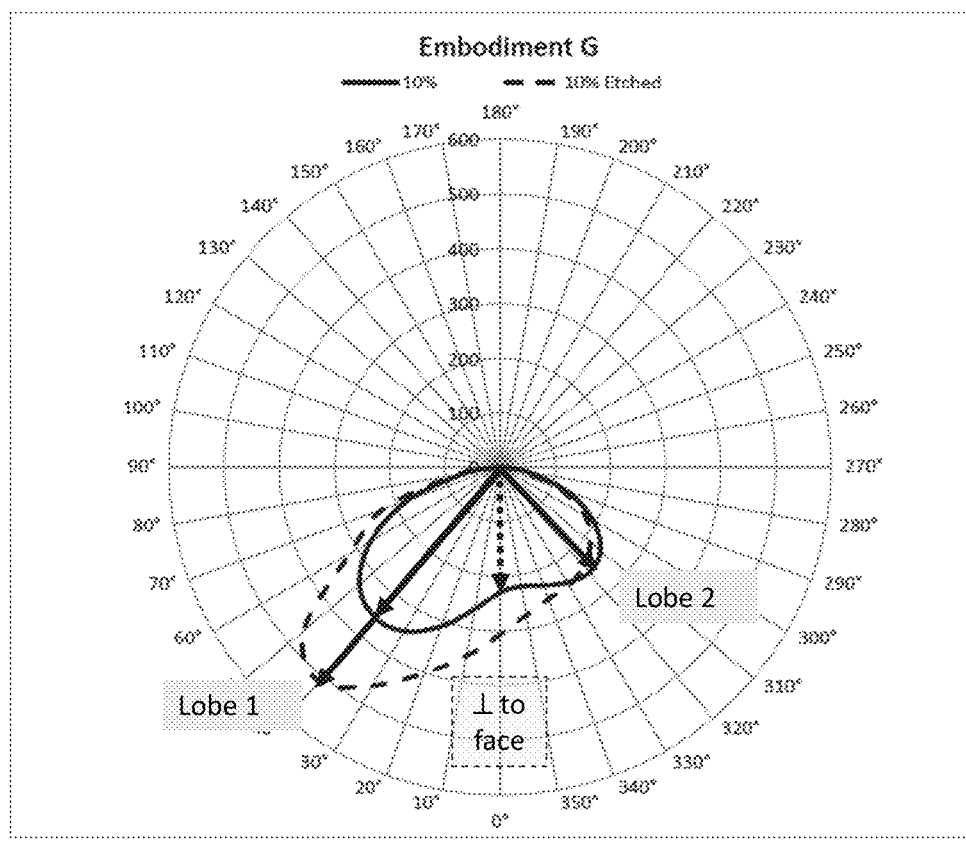
Fig. 18

| Embodiment | Figure | Shape | Lobe 1 Angle (deg) | Lobe 1 Intensity | Lobe 1 to ⊥ % ratio | ⊥ to Face Angle (deg) | ⊥ to Face Intensity | Lobe 2 Angle (deg) | Lobe 2 Intensity | Lobe 2 to ⊥ % ratio |
|---|---|---|---|---|---|---|---|---|---|---|
| A1 | Fig. 10 | Asymmetric | 68 | 760 | 292% | 0 | 260 | 40 | 390 | 150% |
| A2 | Fig. 8 | Batwing | 38 | 500 | 208% | 0 | 240 | 43 | 500 | 208% |
| C2% | Fig. 11 | Asym-Batwing | 38 | 330 | 152% | 0 | 150 | 42 | 225 | 150% |
| C5% | Fig. 11 | Asym-Batwing | 40 | 345 | 230% | 0 | 150 | 42 | 225 | 150% |
| C10% | Fig. 11 | Asym-Batwing | 40 | 355 | 158% | 0 | 225 | 40 | 250 | 111% |
| C20% | Fig. 11 | Asym-Batwing | 40 | 360 | 120% | 0 | 300 | 40 | 250 | 83% |
| D | Fig. 12 | Batwing | 40 | 335 | 152% | 0 | 220 | 42 | 330 | 150% |
| E1-0% | Fig. 14 | Asym-Batwing | 52 | 170 | 283% | 0 | 60 | 54 | 365 | 608% |
| E1-2% | Fig. 14 | Asym-Batwing | 53 | 195 | 300% | 0 | 65 | 52 | 295 | 454% |
| E1-5% | Fig. 14 | Asym-Batwing | 54 | 260 | 260% | 0 | 100 | 51 | 290 | 290% |
| E1-8% | Fig. 14 | Asym-Batwing | 52 | 315 | 210% | 0 | 150 | 49 | 275 | 183% |
| E2-0% | Fig. 15 | Batwing | 50 | 120 | 218% | 0 | 55 | 42 | 200 | 364% |
| E2-2% | Fig. 15 | Batwing | 50 | 185 | 336% | 0 | 55 | 42 | 200 | 364% |
| E2-5% | Fig. 15 | Batwing | 50 | 245 | 233% | 0 | 105 | 39 | 290 | 276% |
| E2-8% | Fig. 15 | Batwing | 50 | 280 | 193% | 0 | 145 | 32 | 300 | 207% |
| F1-0% | Fig. 16 | Wide Batwing | 60 | 300 | 286% | 0 | 105 | 58 | 335 | 319% |
| F1-2% | Fig. 16 | Wide Batwing | 60 | 340 | 309% | 0 | 110 | 57 | 310 | 282% |
| F1-5% | Fig. 16 | Wide Batwing | 59 | 375 | 268% | 0 | 140 | 56 | 275 | 196% |
| F1-8% | Fig. 16 | Wide Batwing | 58 | 410 | 234% | 0 | 175 | 51 | 270 | 154% |
| F2-0% | Fig. 17 | Batwing | 50 | 250 | 313% | 0 | 80 | 50 | 260 | 325% |
| F2-2% | Fig. 17 | Batwing | 50 | 250 | 238% | 0 | 105 | 50 | 270 | 257% |
| F2-5% | Fig. 17 | Batwing | 50 | 275 | 196% | 0 | 140 | 49 | 260 | 186% |
| F2-8% | Fig. 17 | Batwing | 50 | 370 | 206% | 0 | 180 | 48 | 255 | 142% |
| G10% | Fig. 18 | Asymmetric | 40 | 355 | 158% | 0 | 225 | 43 | 240 | 107% |
| G10% Etched | Fig. 18 | Asymmetric | 40 | 505 | 168% | 0 | 300 | 43 | 235 | 78% |

Fig. 19

SINGLE EDGE LIT LIGHTING MODULE AND LIGHT FIXTURE PRODUCING TAILORED LIGHT DISTRIBUTIONS

RELATED APPLICATIONS

This application is a continuation in part of and claims the benefit of non-provisional utility application Ser. No. 15/887,801 titled "Single Edge Lit Lighting Module Producing Tailored Light Distributions" filed Feb. 2, 2018 which itself claims the benefit of provisional patent application Ser. No. 62/453,588 titled "Single Edge Lit Lighting Module Producing Tailored Light Distributions" filed Feb. 2, 2017.

BACKGROUND

The invention relates to edge lit light fixtures which can be used in a variety of illumination applications. In illumination applications in order to achieve more uniform lighting from a surface it is often desired or required to control the light distribution in such a way as to output light from the fixture face with a greater proportion of light in a non-normal orientation. A bi-lobed batwing type distribution, named for the wing like appearance when shown on a polar plot of intensity vs. angle, is one such light distribution commonly used in lighting to provide uniform floor and/or ceiling illumination with a minimal number of fixtures. For general area coverage, a symmetric batwing distribution with two equal lobes each with greater intensity than the normal illumination is typical. For other applications such as targeting light distribution of a down light towards or away from a wall or an uplight in a cove lighting application used to illuminate a ceiling, distributions with one "dominant" lobe with intensity greater than the normal is more desirable.

SUMMARY

A single edge lit lighting module is disclosed which produces tailored light distributions valuable in many illumination applications. The light distributions attainable using the invention include, but are not limited to, symmetric and asymmetric batwing distributions for downlighting and uplighting applications, asymmetric distributions for perimeter and cove lighting and symmetric distributions for task lighting. The invention's unique single edge lit constructions provide the means for achieving desired non-lambertian light distributions without need for conventional two lit edges, thereby economizing on light source components. Furthermore, unusually compact form factors with narrow width can be realized with the single edge lit constructions and these are particularly well-suited for linear lighting fixtures. Various embodiments also provide means for adjusting light distributions dynamically to control light output characteristics by controlling the input signals to the LED board included in the assembly. Also disclosed is the use of an additional light transmitting component over the face of the lighting module to act as the light fixture output face to protect the light guide surface or to further modify the light distribution characteristics.

BRIEF DESCRIPTION OF FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2Bi-v illustrates isometric views of further light guide embodiments.

FIG. 3A and FIG. 3B combined are referred to as FIG. 3, a table listing some embodiments and their key characteristics.

FIG. 4 illustrates various embodiment surface features.

FIG. 5 is a photograph of a cross-section of the embodiment A light guide zoomed in on the surface features.

FIG. 6 shows cross-section views of light guide configuration of embodiments E and F.

FIG. 12 is a polar plot demonstrating the cross-sectional angular output of embodiment module D showing symmetric batwing light distribution.

FIG. 13 is a polar plot demonstrating the cross-sectional angular output of embodiment module D with different diffusion levels.

FIG. 14 is a polar plot demonstrating the cross-sectional angular output of embodiment module E1 with 12-6 light guide surface pattern on output face.

FIG. 15 is a polar plot demonstrating the cross-sectional angular output of embodiment module E2 with 12-6 light guide surface pattern on inner face.

FIG. 16 is a polar plot demonstrating the cross-sectional angular output of embodiment module F1 with 6-12 light guide surface pattern on output face.

FIG. 17 is a polar plot demonstrating the cross-sectional angular output of embodiment module F2 with 6-12 light guide surface pattern on inner face.

FIG. 18 is a polar plot illustrating the increased cross-sectional asymmetric angular output of embodiment module G having an etched light guide surface.

FIG. 19 is a table summarizing the key optical measurements for each of the lighting module embodiments.

DETAILED DESCRIPTION

Figure 1A:
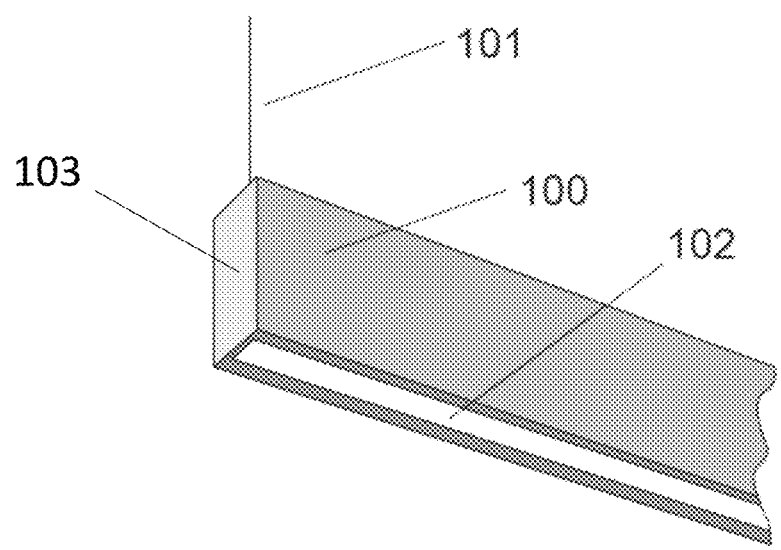
FIG. 1A is an isometric view of a light fixture with an embodiment lighting module.

FIG. 1A is an isometric view of an embodiment light fixture with an embodiment lighting module. The lighting module is contained within a housing 100 with end cap 103 and supported by a wire hanger 101. Light is transmitted from the fixture through a light fixture output face 102. This could be the output face of the lighting module or an optically transmitting component 20 positioned over the lighting module output face such as a cover lens or a glare control film.

Figure 1B:
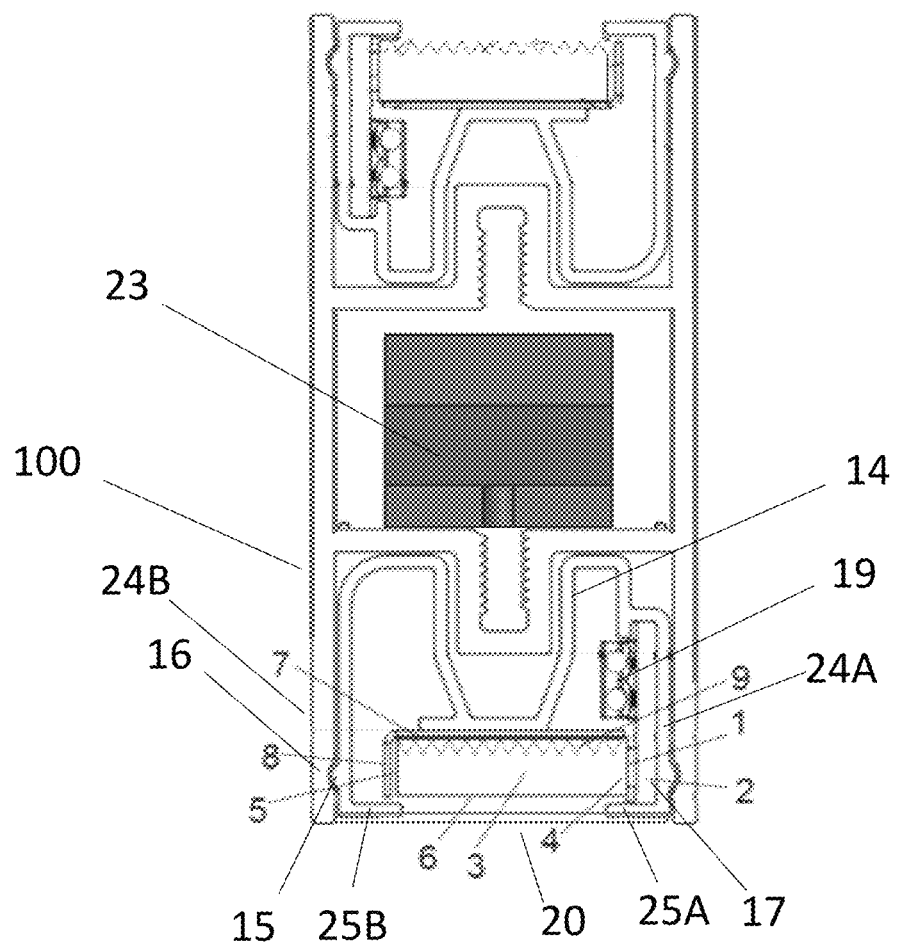
FIG. 1B is a cross sectional view of the light fixture with its end cap removed showing the embodiment lighting module enclosed within the fixture body.

FIG. 1B is a cross sectional view of the embodiment light fixture in FIG. 1A with the end cap 103 removed. The lighting module housing 14 is contained withing the light fixture housing 100 and comprises the light source, an LED board 2, consisting of individual light emitting diodes (LEDs) 1 mounted on a printed circuit board (PCB) 17 which supplies electrical power to the LEDs, which are arranged on the PCB in adjacent rows and positioned proximate to the light guide input face 4. The PCB also contains a surface mount electrical connector 19 which is able to receive wires from a driver or controller 23. Light emitted from the LEDs 1 enters the light guide through the light guide input face 4 and propagate through the light guide 3, partially internally reflecting from the faces of the light guide due to difference between the refractive index of the light guide and refractive difference of surrounding medium, typically air. Some light does not internally reflect at the surface but rather escapes from the output face 6, typically with a light distribution centered at an angle less than 90 degrees from the output surface 6 and tilted away from the input face. Light that propagates through the light guide and exits through a light guide opposing face 5 is reflected back into the light guide by the reflector 8, the light guide opposing face effectively becoming in function a light guide input face. The reflector 8 wraps around both the light guide opposing face 5 and light guide inner face 7. Light that escapes the light guide 3 through the inner face 7 is reflected back into the light guide 3. For a reflector that is a specular reflector, light reflects back towards the light guide at the same angle from normal as light incident onto the reflector. Reflectors with a component of diffuse reflectance will produce more light scattering and a more dispersed light reflection. Further, an optically transmitting component 20 is optionally positioned over the lighting module output face. The function of the optically transmitting component may be to protect the surface of the light guide and seal it from moisture, chemicals or dust, to provide a different surface aesthetic to aid the overall look of the light fixture, or it may be used to change the lighting distribution before it exits the light fixture output face. Specific embodiments of a light transmitting component 20 are a cover lens or a glare control film to act as the output face 102 of the light fixture. As alternative arrangements, the optically transmitting component 20 may also be held in place by the lighting module housing 14 or light fixture housing 100. The optically transmitting component 20 may be a clear cover lens or filter, a volumetric scattering or surface relief diffuser, refractive lens or light control film. If the diffuser is a strong diffuser with high levels of light scattering such as high haze and low clarity or a lambertian diffuser then the output of the lighting module will become more rounded, less bi-lobed and similarly closer to lambertian. If the diffuser has a higher clarity and low haze then the bi-lobed angular characteristic of the lighting module will be preserved. Another benefit of a diffuser is that it will help improve uniformity of the light emitting surface and smooth out any small variations in intensity or color in the projected lighting distribution. If the diffuser has surface relief refractive features or if a refractive lens or light control film is used it is possible to alter the angles of the lobes and the overall shape of the lighting distributions. It is also possible to design the light fixture or lighting module housing so the optically transmissive component is removable and interchangeable with a different optically transmissive component. This enables light distributions to easily be improved and changed in the field after the light fixture has been installed. This is useful to avoid cost and time required to return to the factory and deliver a replacement. Optically transmissive components can be easily manufactured using techniques such as profile, sheet or film extrusion, continuous film or sheet casting, injection or compression molding, application of additional coatings, and embossing of optical films. Typically, materials used to manufacture optically transmitting components include glass and optically transmissive plastics such as silicones, PMMA (polymethyl methacrylate), polycarbonate, PET, COC and polystyrene. It is obvious to those skilled in the art that alternative production methods would yield similar results. For instance, if the optically transmitting component were made to the same dimensions and design and using similar materials in a film or sheet extrusion process or a continuous polymer casting process the optical performance of the optically transmitting component would be operationally similar. The design of the lighting module housing 14 is important to the invention as it protects and holds all the key components of the lighting module in alignment as well as providing a means to support electrical wiring and connections. The lighting module housing comprises a side wall portions 24A and 24B and a supporting ledges 25A and 25B that are orthogonal extension of the side wall portion; wherein the supporting ledge 25A supports the light guide and holds the LED board in a position in alignment with the light guide input face. Supporting ledge 25B supports the reflector and/or light guide. As configured in the particular embodiment of FIG. 1B, the supporting ledge 25A extends further past the input face 4 of the light guide face than the supporting ledge 25B extends past the opposing face 5 of the light guide. This is too lessen the appearance of a bright region near the input face and improve brightness uniformity appearance. The inside surfaces of lighting module housing may also be coated with a highly reflective paint, such as a high brightness white powder coated paint, or some other reflective material that can be applied. Such a coating may be used in place of reflective components described in lighting module embodiments. In the embodiment of FIG. 1B, both the light fixture housing 100, and the lighting module 14 are linear profile extrusions. These extrusions are typically made from aluminum or some other rigid extrudable material such as metal or plastic. The three dimensional form is that of a 2 dimensional cross-sectional profile area extruded linearly in perpendicular direction. The lighting module 14 is further designed to be removable and to snap into the light fixture housing 100 and is held in place by a linear bump 15 on its sides that locates into a linear notch 16 in the light fixture housing 100. Alternatively, the light fixture housing could have a linear bump that mates with a linear notch in the lighting module housing to create a "push fit" for insertion and removal and a means to hold the module in place during normal operation of the light fixture. In either case the side portions the lighting housing module are flexed inward as the lighting module housing is inserted into or removed from the lighting housing. In alternative embodiments, other components and configurations can be used to position, fasten, insert, and remove a lighting module within a light fixture housing. Examples include but are not limited to Velcro, screws, clips, springs, and magnetic components.

The linear profile geometry of the lighting module housing and light fixture housing are well suited for manufacture by extrusion can be cut to length to produce light fixtures of various specified length. Typically, light fixture end caps 103 are fitted with the light fixture housing 100 to cover and enclose the ends of the light fixture.

In alternative embodiments, the lighting module housing is not removable but rather is integrated into the lighting fixture housing and the light fixture housing can be configured to incorporate the required features of the lighting module housing to directly assemble, hold, and position the linear lighting module components within the light fixture. It is also possible to use two lighting module housings in the same light fixture housing or configure the light fixture housing to integrate the features of the two lighting module housings. The purpose of two lighting modules may be to provide both direct downlighting and indirect uplighting from the same fixture, either at the same time or to be controlled independently. Two lighting modules would also be able to provide two forms of lateral or sideways light output from a light fixture. This might be useful in a vertical wall mounted application or for illuminating corridors or aisles in a retail display environment such as a supermarket.

Figure 2A:
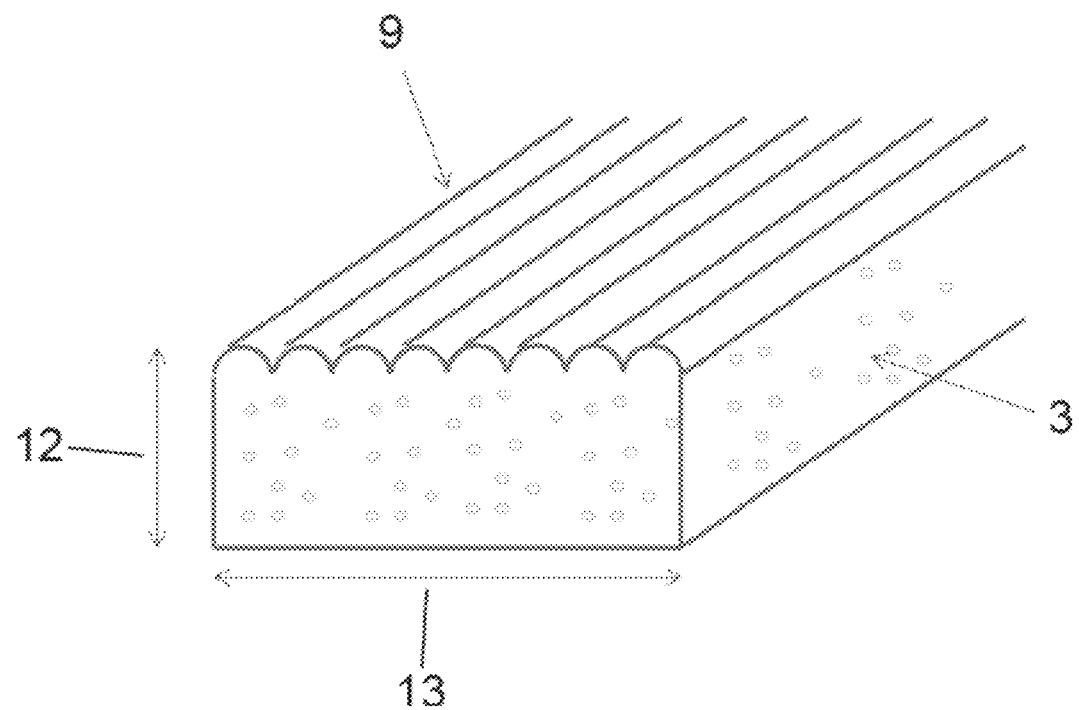
FIG. 2A is an isometric view of a light guide illustrating key elements.

FIG. 2A is an isometric view of a light guide embodiment illustrating key elements. Important to various embodiments are dimensions of width and height. Surface features, their pattern of arrangement on a face of the light guide, and the amount of the face which is covered by the surface features are of importance in converting internal reflection within the light guide to output from the module at desired angular light distribution. Volumetric light scattering is also an important variable in effecting light diffusing properties that influence the amount of outcoupling from the light guide, the peak intensity and spread of angular light distribution in each lobe, and the symmetry of the beam pattern. Volumetric light scattering is produced by dispersed light scattering regions 21 within the light guide having refractive index different than the bulk matrix material. Concentration of light scattering regions can be controlled in the manufacturing process used to produce the light guide Light guides are typically made from a high clarity optically transmissive material such as glass or an optical polymer such as optically clear versions of PMMA (polymethylacrylate) or PC (polycarbonate) resins. When the light guide is made from PMMA using polymer film, sheet, or profile extrusion, injection molding or continuous casting or cell casting techniques can be use. One method for incorporating the light scattering regions 21 of FIG. 2A into the bulk optically transmissive material is to include microbeads of differing refractive index than the bulk optically transmissive material or to include a commercially available diffusion resin in the light guide formulation. Alternative means in creating dispersed regions of differing refractive index from the light guide matrix material include dosing microbeads into the light guide resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light guides in this manner include extrusion, casting, and injection molding. FIG. 2Bi-v details further isometric views of various light guide embodiments based upon key elements detailed in FIG. 2A description. Light guides produced and tested included planar light guides with no surface features and planar light guides with surface features. Planar light guides with surface features also had different feature shapes and varying patterns. Diffuse planar light guides are categorically defined as light guides without surface features but it should be clarified that at a small scale it there are dispersed patterns of small surface protrusions and indentations corresponding to light scattering particles within the light guide that are at or near the surface. In some embodiments this can be noticeably apparent by a matte finish of reduced gloss and can be quantitatively measured with a gloss meter. It is within the scope of the invention to add matting agents to the light guide formulation to reduce the smoothness or gloss of a light guide face to increase light extraction. Light guides were produced in PMMA using profile extrusion techniques. Surface patterns were produced using in-line tooling or using a secondary process step using a laser engraving equipment. It is obvious to those skilled in the art that alternative production methods would yield similar results. For instance, if the light guides were made to the same dimensions and design and using similar materials in a film or sheet extrusion process or a continuous or cell cast polymer casting process or using an injection molding techniques the optical performance of the light guides would be operationally similar.

FIG. 3 is a table listing fabricated and tested light module embodiments and their key differentiating characteristics of light guide orientation, light guide height, light guide width, light guide surface feature geometry, bulk diffusion concentration, and reflector type.

FIG. 4 illustrates example embodiment surface patterns that have been developed to generate alternative beam output light distributions from light guide embodiments. These vary in both surface feature 9 size and shape as well as spacing of flat gaps between features and are labeled as SP1, SP2, SP3, SP4, and SP5. Alternative embodiments may utilize any variety of surface features that can be feasibly fabricated. Extrusion is a process in which lengths of light guide can be feasibly produced with patterns linear in the length dimension. In this case, prisms and lenticular designs can be readily produced. Asymmetric patterns including linear prisms with cross-sectional geometry of sawtooth triangles are also useful embodiments.

FIG. 5 is a photograph of a cross-section of the embodiment A light guide 3 zoomed in on the surface features 9 viewed against an air 26 background. The features are fundamentally triangular prism lenticular with sides of the triangle being slightly concave. In this embodiment the peaks of the surface features are sharper than the troughs which are more rounded.

FIG. 6 shows cross-section views of light guide configuration of embodiments E and F. The width of each light guide is 18 mm with 4.5 mm height. In embodiment E the first 6 mm of light guide surface adjacent to the input surface 4 has a flat surface and the next 12 mm of light guide surface 11e has a lenticular pattern 10e extending to the light guide opposing face 5.

Figure 7:
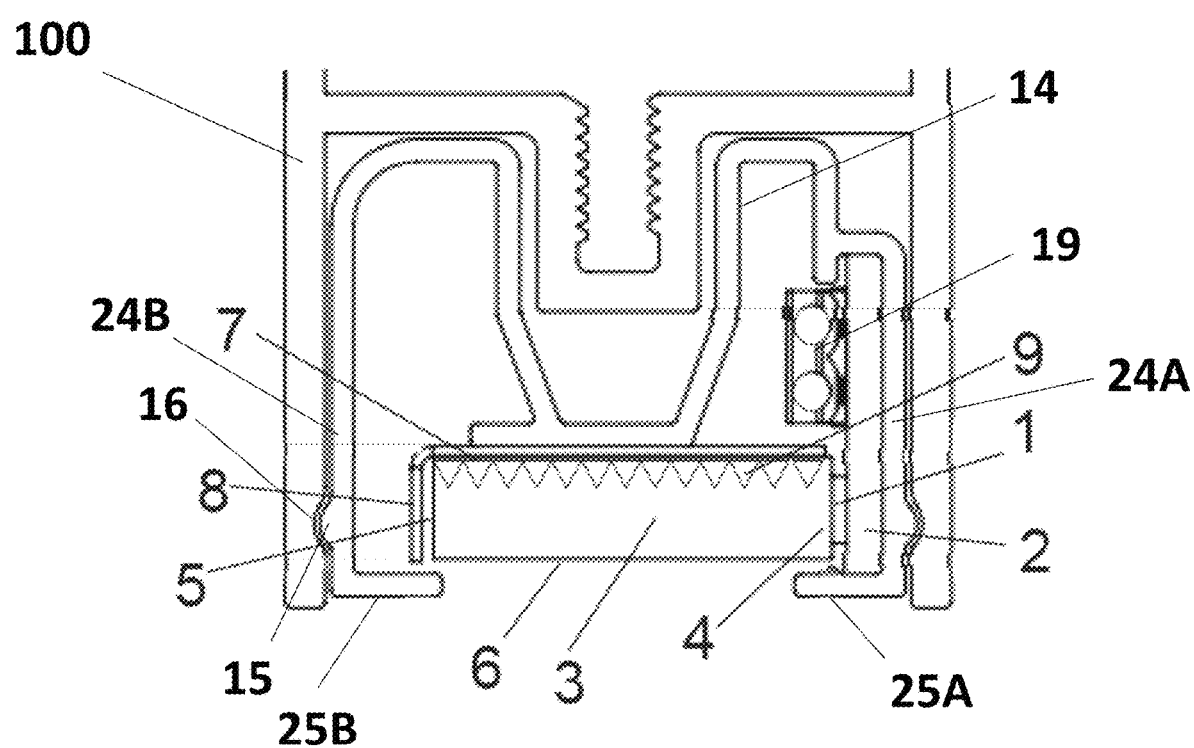
FIG. 7 is a cross-section view of lighting module embodiment A2.

FIG. 7 is a cross sectional view of lighting module embodiment A2. The lighting module housing 14 is contained withing the light fixture housing 100 and comprises the LED board 2 consisting of individual light emitting diodes (LEDs) 1 which is positioned adjacent to the light guide 3. Typically, the light guide thicknesses is chosen to be greater than the height of the LED 1 which is aligned central to the light guide input face 4, both are chosen for the purpose of maximizing the light inputted into the light guide. A typical light guide thickness used is 4.5 mm to 5 mm, and a typical mid-power LED package size is 2.8 mm×3.5 mm (2835), 3.0 mm×3.0 mm (3030) or 5.6 mm×3.0 mm (5630). Changing the thickness of the light guide and the positioning of the LED relative to the light guide center can also be used to control light distributions. Light emitted from the LEDs 1 enters the light guide through the light guide input face 4 and propagates through the light guide 3, partially internally reflecting from the faces of the light guide due to difference between the refractive index of the light guide and refractive difference of surrounding medium, typically air. Light guides typically comprise optically clear polymer or glass with high level of light transmission and refractive index greater than that of air which is 1.0. For example, polymethyl methacrylate (PMMA) is a common light guide material with refractive index of approximately 1.49. Some light does not internally reflect at the surface but rather escapes from the output face 6, typically with a light distribution centered at an angle less than 90 degrees from the output surface 6 and tilted away from the input face. Light that propagates through the light guide and exits through a light guide opposing face 5 is reflected back into the light guide by the reflector 8, the light guide opposing face effectively becoming in function a light guide input face. The reflector 8 wraps around both the light guide opposing face 5 and light guide inner face 7. Light that escapes the light guide 3 through the inner face 7 is reflected back into the light guide 3. For a reflector that is a specular reflector, light reflects back towards the light guide at the same angle from normal as light incident onto the reflector. Reflectors with a component of diffuse reflectance will produce more light scattering and a more dispersed light reflection. The reflector or reflective surface is typically made from a bent cut out of a commercially available reflective coated aluminum sheet or a high reflective optical plastic film or sheet such as white PET, PC or PMMA. Such products are manufactured using techniques similar to those used to produce optical transmitting components 20. It's also possible to extrude, cast, stamp or otherwise form a rigid profile out of reflective material that is designed to conform to the desired shape to fit in the light module housing. It is also possible to use a highly reflective white paint or reflective coating applied to the inner surface of the lighting module housing to replace either of the inner face or opposing face reflectors.

Figure 8:
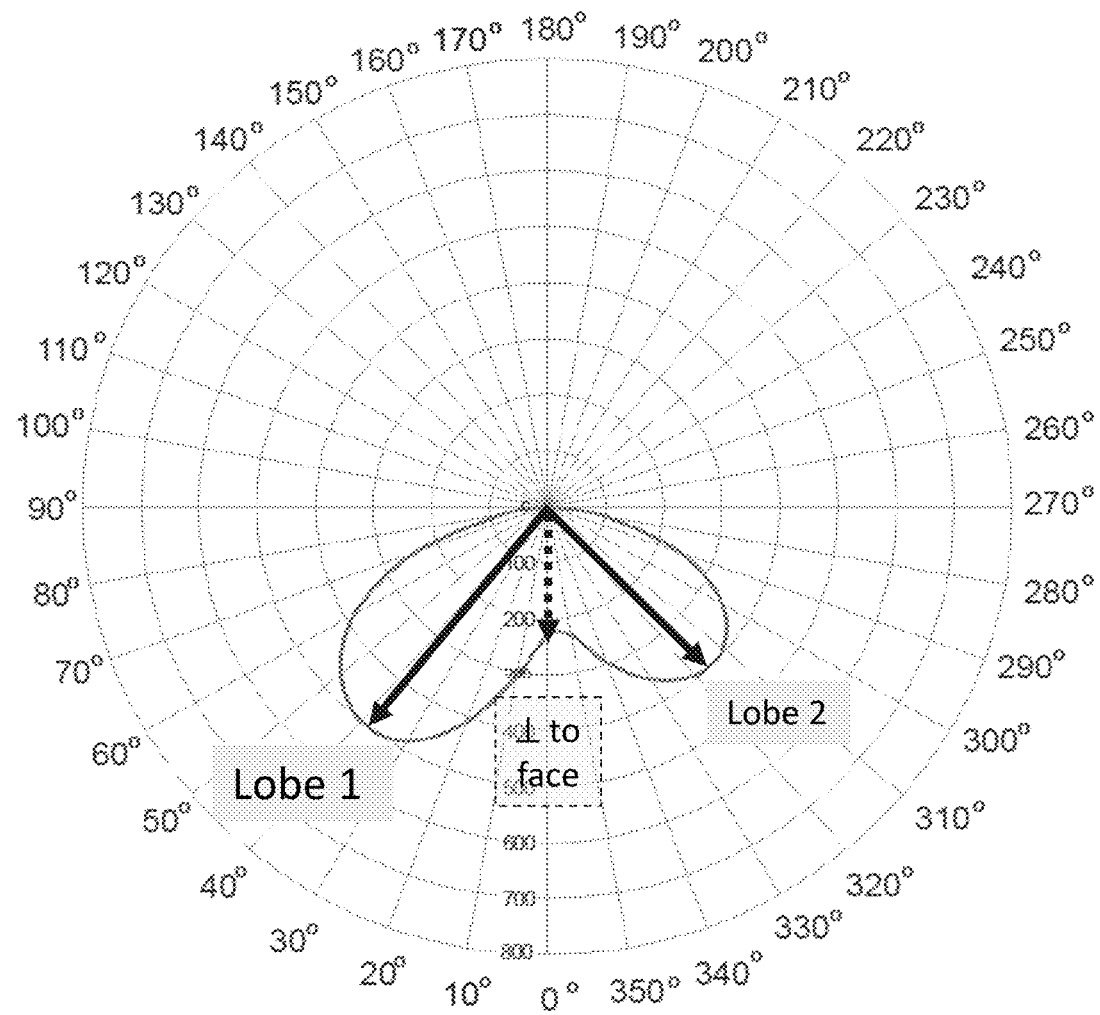
FIG. 8 is a polar plot showing cross-sectional angular light distribution of embodiment A2 lighting module.

FIG. 8 is a polar plot showing cross-sectional angular light distribution of embodiment A2 lighting module with surface features on the inner face of the light guide. The angular lobes are of a generally desirable bat wing type with the lobes at 40 degrees either side of the normal from the surface of the light guides. Both lobes are approximately 60 degrees full width half maximum (FWHM) but the angular lobes are of unequal peak intensity and for most applications a more symmetric distribution would be preferred and specified.

Figure 9:
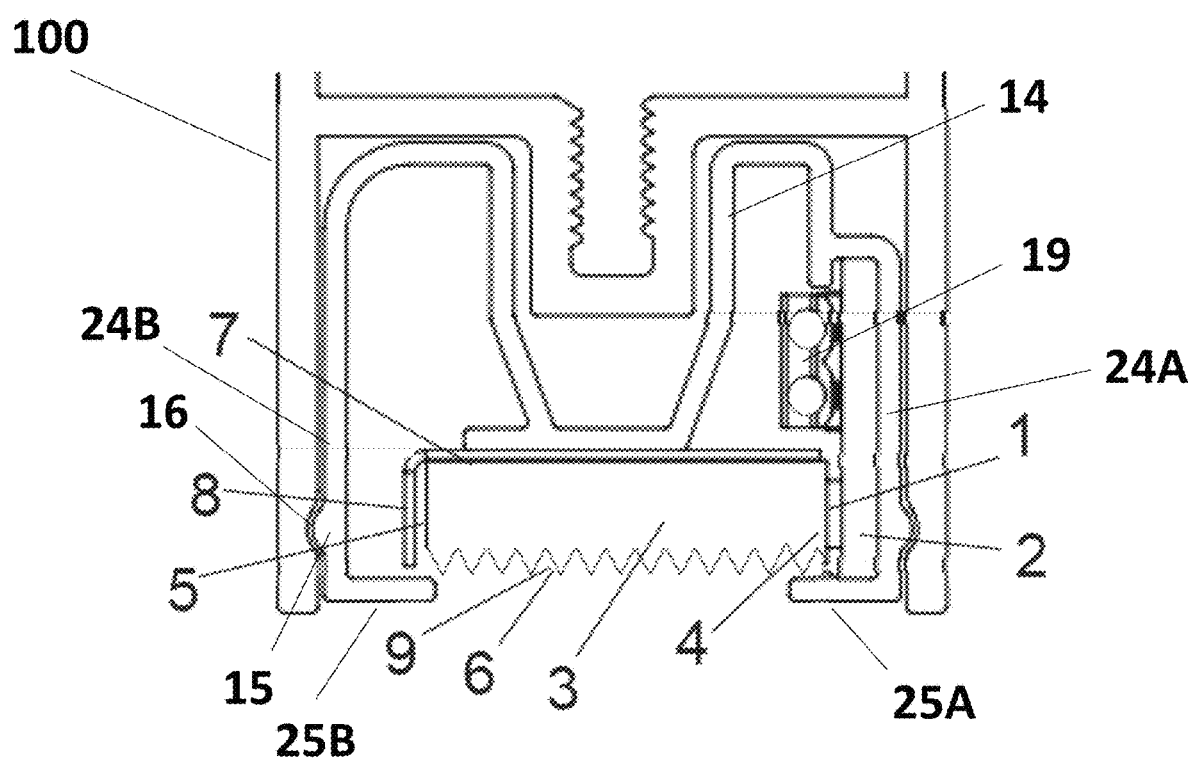
FIG. 9 is a cross-section view of lighting module embodiment A1.

FIG. 9 is a cross-section view of lighting module embodiment A1. This is the same as embodiment A2 except for the orientation of the light guide which has the surface features 9 positioned on the light guide output face 6 instead of on the light guide inner face 7 as in FIG. 7.

Figure 10:
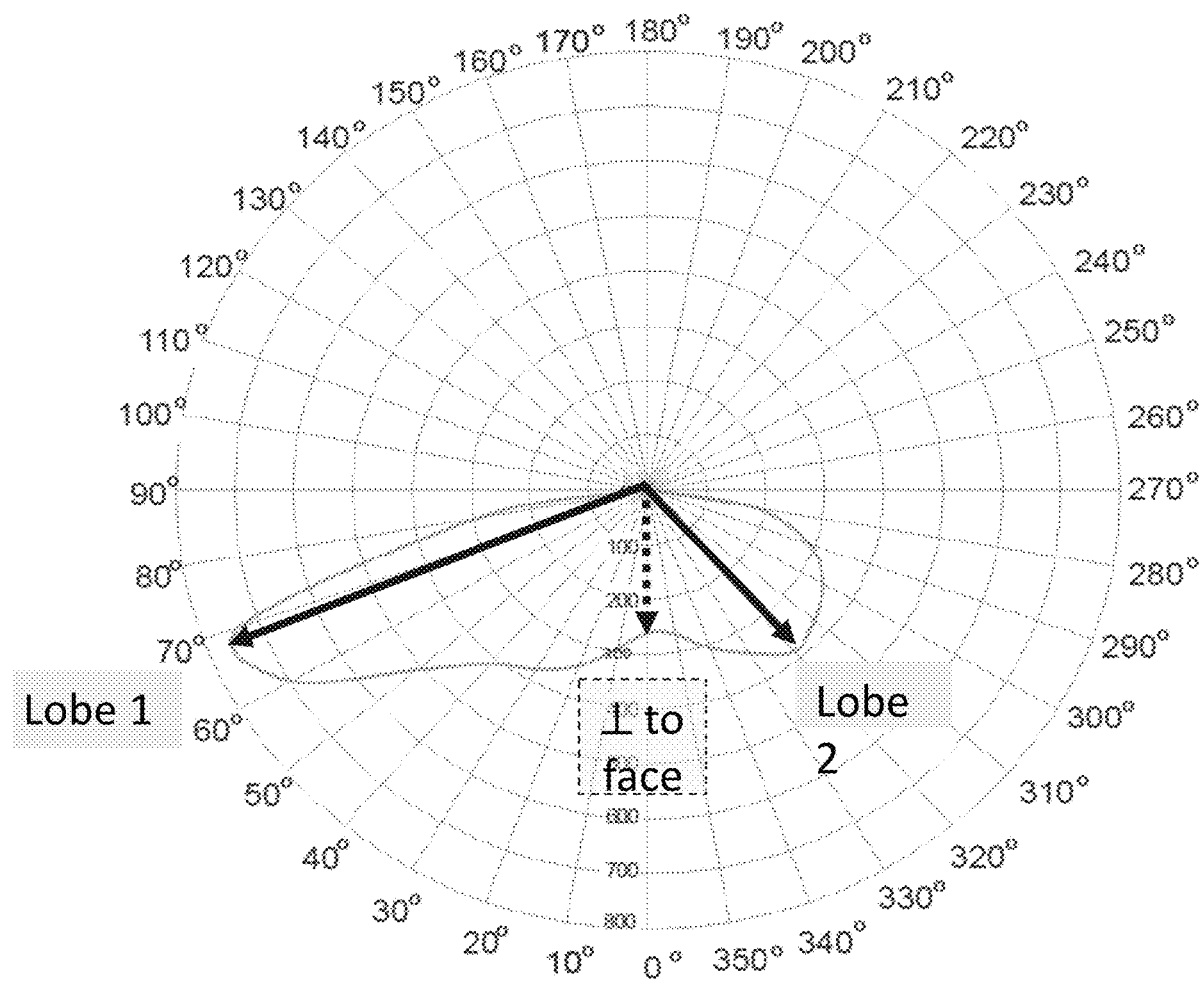
FIG. 10 is a polar plot showing cross-sectional angular light distribution of embodiment lighting module A1.

FIG. 10 is a polar plot showing cross-sectional angular light distribution of embodiment lighting module A1 with surface features on the output face of the light guide. The angular light distribution is more asymmetric with light emitted less normal to the output surface than embodiment A2 which has the light guide orientation reversed. One of the lobes still has a peak intensity at 40 degrees and it's width is still approximately 60 degrees FWHM whereas the other lobe now has a peak intensity at close to 70 degrees with a FWHM of approximately 40 degrees. This distribution is particularly useful for ceiling and wall washing in cove lighting applications.

Figure 11:
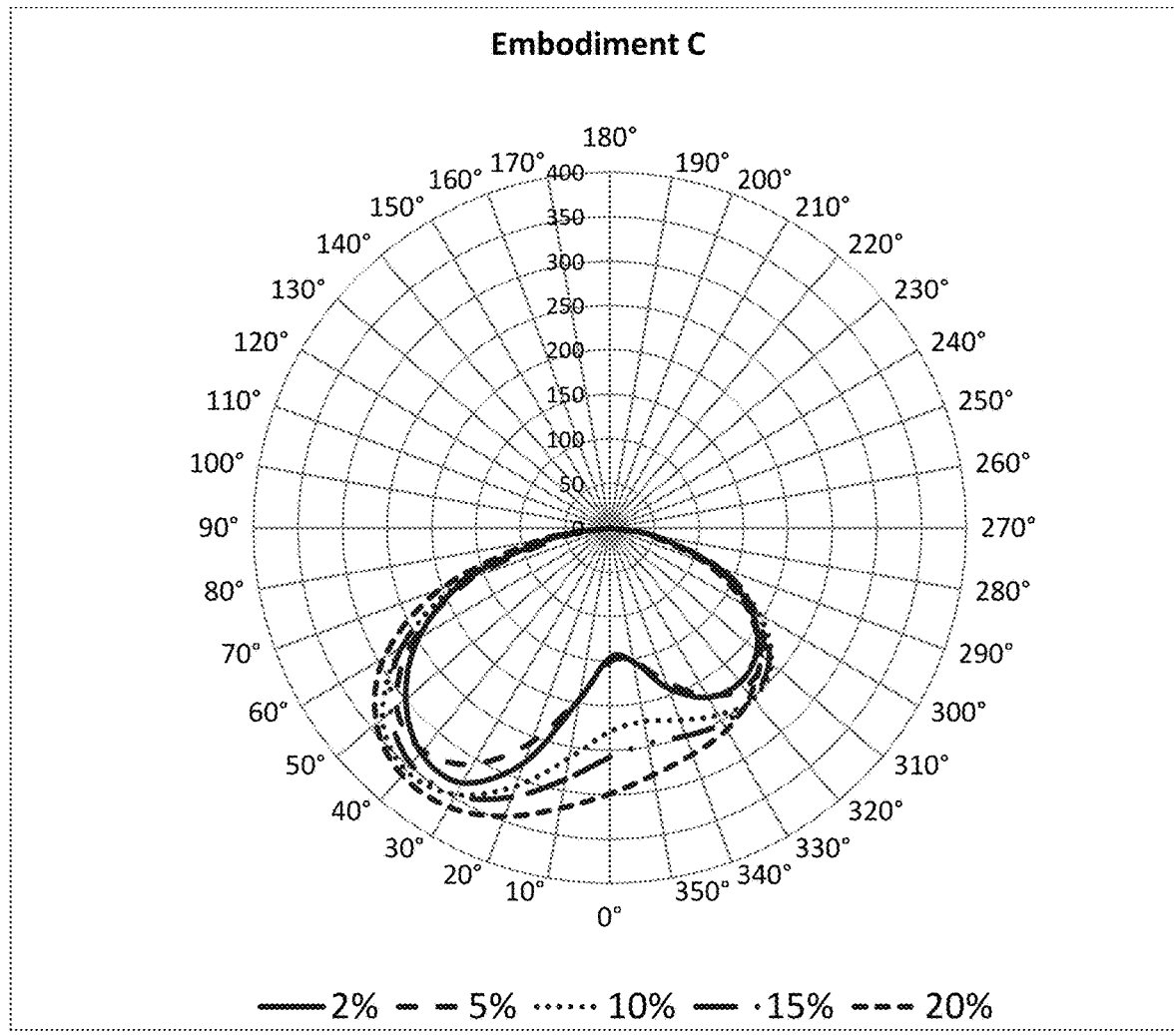
FIG. 11 is a polar plot relating to embodiment C and demonstrates effect of diffusion concentration on cross-sectional angular output.

FIG. 11 is a polar plot relates to embodiment C and demonstrates effect of diffusion concentration on cross-sectional angular output. Increasing diffusion concentration results in more overall output but less distinct bat wing lobes.

FIG. 12 is a polar plot demonstrating the cross-sectional angular output of embodiment module D showing symmetric batwing achieved with a light source input into only one face of a light guide. The batwing light distribution is desirable in many downlighting applications as it provides even illumination when projected onto flat surfaces such as floors and tables. To achieve this light distribution through a light guide with only one light source instead of the customary two provides reduced cost and a more narrow compact form factor.

FIG. 13 is a polar plot demonstrating the cross-sectional angular output of embodiment module D with different diffusion levels. The plots show the trends of increased luminous output and decreased angular asymmetry with increasing diffusion amount. The increased diffusion amount increases light scattering and the proportion of light which contacts a face of the light guide at an angle exceeding the critical angle of reflection thus exiting the light guide and not internally reflecting inside the light guide.

FIG. 14 and FIG. 15 are polar plots demonstrating the cross-sectional angular output of embodiment module E with the surface patterned face of the light guide as the output face (E1-FIG. 14) and inner face (E2-FIG. 15). In this embodiment the light guide has a pattern of surface lenticular area as illustrated as "Embodiment E" in FIG. 6. The light guide has a total width of 18 mm having on one 18 mm wide face an area of flat surface 6 mm wide and an area of lenticular pattern 12 mm wide. All plotted data is from testing done with the flat area of the patterned face adjacent to the input face of the light guide and the lenticular surface area positioned adjacent to face of the light guide opposing the input face. The plots show light distribution results with patterned lenticular face that are significantly different from and useful in a different manner than results from the full surface lenticular of embodiments A-D. In embodiments A-D the light distribution output in all cases is asymmetric with a larger lobe in the direction away from the light guide input face. In embodiment E the larger lobe of asymmetric output is in the direction toward the input light guide face. As diffusion level within the light guides of embodiment E is increased, the light distribution shifts more away from the input face of the light guide. With increasing diffusion level, there is a level where there is a net balance of surface feature and volumetric diffusion that results in a balanced bat wing type light distribution having lobes of light distribution that are largely symmetric and similar. For embodiment E this diffusion level appears by interpolation of FIG. 14 and FIG. 15 plots to be somewhere between 5% and 8%. Another useful feature of the lighting distributions is that the angular spread of the lobes is increased. The peak intensity of the lobes now occurs at 50 degrees. A wider angular spread of the lobes is particularly useful for the indirect uplighting of ceilings or other surfaces.

FIG. 16 and FIG. 17 are polar plots demonstrating the cross-sectional angular output of embodiment module F with the surface patterned face of the light guide as the output face (F1-FIG. 16) and inner face (F2-FIG. 17). In this embodiment the light guide has a pattern of surface lenticular area as illustrated as "Embodiment F" in FIG. 6. This light guide is similar to embodiment E but the patterned surface is changed to have 12 mm of flat surface area width and 6 mm of lenticular surface area as compared to 6 mm flat and 12 mm lenticular surface areas of embodiment E. As evidenced by the light distribution polar plots in FIG. 16 and FIG. 17, the degree of light output oriented toward the light guide input face is reduced in embodiment F vs. embodiment E, apparently due to the reduced area of lenticular on the patterned surface. This indicates that the percentage of surface pattern with light redirecting feature chosen can be used to adjust the light distribution and achieve targeted outcomes such as batwing light distribution. In the case of embodiment F1 both lobes have a peak intensity at 60 degrees with a width approximately 50 degrees. This distribution is also particularly useful for illumination of ceiling in a linear uplight configuration.

FIG. 18 is a polar plot illustrating the asymmetric angular output of an embodiment module G. The asymmetric angular output was first generated by a diffuse planar light guide G10% which had no surface features and a 10% diffusion resin concentration which results in dispersed light scattering regions 21. The light guide G10% Etched on the other hand had one of the adjacent surfaces of the same planar light guide etched with a pattern generated by a laser. The etching process imparts tiny laser etched features 22 on top of the planar design of the non-etched light guide. Both the etched and non-etched diffuse planar light guides produced an asymmetric distribution with one of the angular lobes greater than the intensity at normal. When comparing the output of the embodiment G using the etched light guide surface to the diffuse planar light guide it was noted that the lobes are both angled at 40 degrees from the normal. However the ratio of the peak intensity of the two lobes and width are significantly increased by the process of etching the surface.

As with the more symmetric bi-lobed light distributions the angle from the normal of the larger lobe and its width can be modified by controlling light guide properties such as the shape and patterning of surface features and the level of volumetric scattering and reflector properties such as the relative degree of specular and diffuse reflectance. The angle can be further controlled by simply tilting the light module such that its output face becomes inclined at an oblique angle relative to the horizontal. The degree of inclination will add or subtract to the angle from the normal prior to the tilting. The light module output face can also be tilted to the point where it is vertical. Such an arrangement might be optimal for a wall washing application where it is desirable not to see any light emitting surface in front of the wall.

FIG. 19 is a table summarizing the key optical measurements for each of the lighting module embodiments. For each embodiment, the percentage intensity of each lobe relative to the intensity at normal and the angle of each lobe from normal is provided. In each case of a batwing shaped distribution both lobes have an intensity that is greater than the intensity at normal. In the case of a asymmetric distribution only one of the lobes has an intensity that is greater, with the other lobes being substantially less than the normal intensity.

As demonstrated in the tables of FIG. 3A, FIG. 3B, and FIG. 19, specific light guide composition and surface features can be configured to create single edge it lighting modules with specific light distributions advantageous and desired for particular lighting applications. Furthermore, a single light guide configuration can be flipped or rotated in orientation relative to the reflector and LED board to enable two or more different light distributions with a single light guide. This is advantageous for a lighting fixture assembler as only one light guide component needs to be specified and supplied instead of multiple, typically leading to advantages in lower inventory and lower pricing. For on-site assembly, a single light guide with more than one possible light distributions enables light distribution selection to be made and evaluated on-site. On-site light guide configuration and changes are made easier by the removable lighting module embodiments such as shown in FIG. 7.

Figure 20:
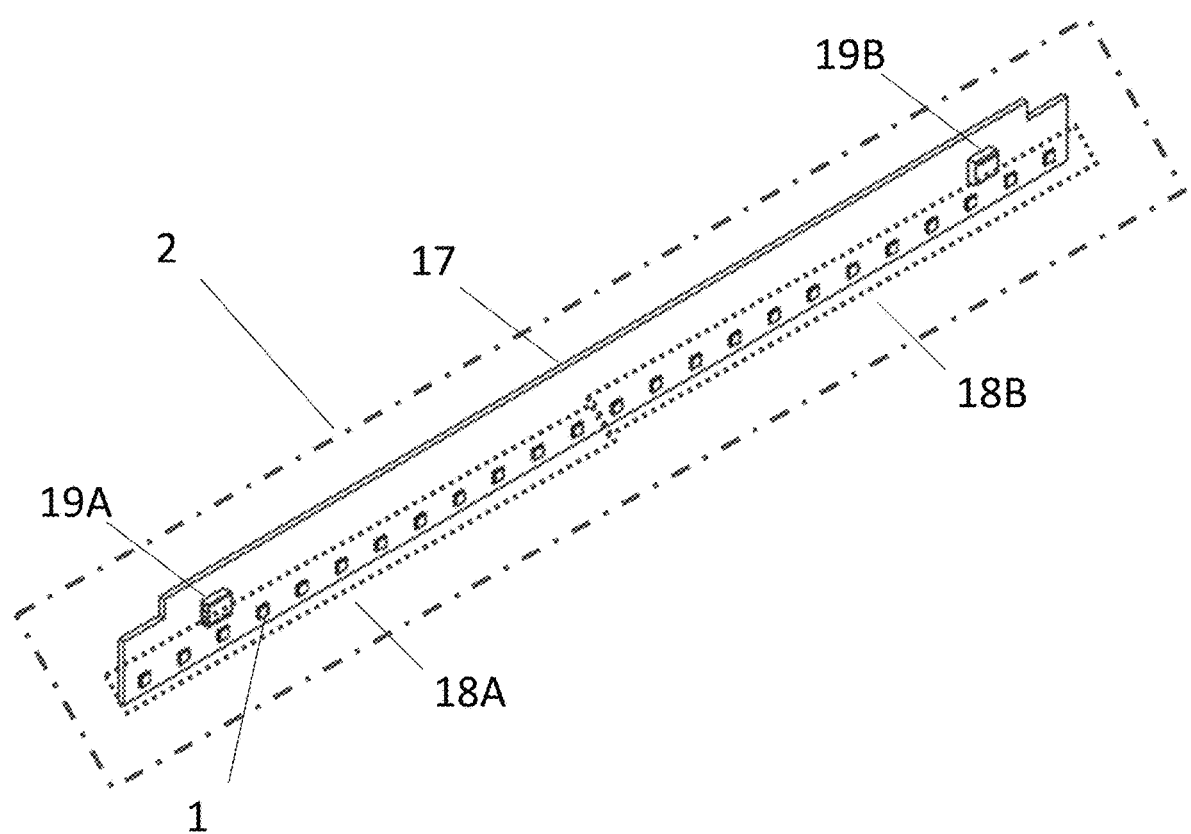
FIG. 20 is a perspective view of an embodiment LED board.

FIG. 20 is a view of an LED board 2 comprising printed circuit board 17, with adjacent rows 18A and 18B of LEDs 1 and electrical connectors 19A and 19B as used in the various lighting module embodiments. In this case there are two collinear rows of LEDs each containing 12 LEDs in series. Electrical power is supplied to each row 18A and 18B via a surface mounted electrical connector 19A and 19B respectively. Various embodiments also provide means for adjusting light distributions dynamically to control light output characteristics by controlling the input signals to the LED board included in the assembly. The number of LEDs in each row is determined by the chosen driver and controller. Typical commercially available drivers are classed as either constant current or constant voltage. Typical constant current drivers deliver a DC input voltage in the range of 30V to 48V. The forward voltage of LEDs is approximately 2.7V-2.8V. This means that rows of LEDs in series typically contain 10 to 16 LEDs. Fewer LEDs per row may also be used such as with a typical 12V or 24V constant voltage drivers which is a common configuration for LED tape lights. Adjacent rows can be arranged in a continuous line on the PCB as shown in FIG. 20, or in parallel, or in an interleaving arrangement where LEDs of one row alternate with LEDs of another. Typically rows of LEDs are a few inches long and LED boards range in length from a few inches to 4 feet. The PCB is typically either FR4, a composite material, or metal core (MCPCB), and in most cases the electrical circuit is produced in copper or a similar highly conductive material. In the case of long lengths of linear lighting modules multiple LED boards are typically connected together in. It is also possible through simple modifications to the printed circuit board design to apply electrical power to one or more adjacent rows at the same time or control adjacent rows independently. When connecting multiple LED boards together it's useful to offset the positioning of connectors on PCB such that they are behind the light guide and reflector. This enables adjacent rows of LEDs to not be interrupted by connectors and avoids the problem of "connector shadow", a dark area visible on the light fixture or lighting module output face.

LIST OF NUMERICAL REFERENCES

1 LED
2 LED board
3 Light guide
4 Light guide input face
5 Light guide opposing face
6 Light guide output face
7 Light guide inner face
8 Reflector
9 Surface Features
10 Lenticular surface
11 Flat surface
12 Height
13 Width
14 Lighting module housing
15 Linear bump in lighting module housing
16 Linear notch in light fixture housing
17 Printed circuit board (PCB)
18 Row of LEDs
19 Electrical connector
20 Optically transmitting component
21 Light scattering region
22 Laser etched surface features 23 Electrical driver or controller
24 Lighting module side wall portion
25 Lighting module supporting ledge
26 Air
100 Light fixture housing
101 Wire hanger
102 Light fixture output face
103 Light fixture end cap

What is claimed is:

1. A lighting module comprising;
   a) a lighting module housing;
   b) a light guide comprising;
      i) an optically transmissive material comprising dispersed regions of optically transmissive solid material within a bulk matrix material wherein a refractive index of the dispersed regions is different than a refractive index of the bulk matrix material,
      ii) a single input face,
      iii) an opposing face non-adjacent to the single input face,
      iv) an inner face adjacent to the single input face,
      v) an outer face adjacent to the single input face;
   c) a light source inputting light into the single input face of the light guide;
   d) a first reflective surface positioned external of the light guide and proximate to the light guide inner face wherein light exiting the light guide inner face is reflected back into the light guide from the first reflective surface; and
   e) a second reflective surface positioned external of the light guide and proximate to the light guide opposing face wherein light exiting the light guide opposing face is reflected from the second reflective surface;
   wherein the light output from the lighting module is a bi-lobed light distribution exiting from the outer face wherein each lobe is angularly oriented in a non-normal direction with respect to an output face of the module and at least one lobe has a greater peak intensity than the lighting module output intensity normal to the outer face.

2. A lighting module of claim 1 in which the light source is comprised of at least one linear array of light emitting diodes.

3. A lighting module of claim 1 wherein the light guide is planar with width to height aspect ratio of less than 4.

4. A lighting module of claim 1 in which a width of the light guide is less than 30 mm.

5. A lighting module of claim 1 wherein the bulk matrix material is either polymer or glass and has a refractive index greater than 1.0.

6. A lighting module of claim 1 wherein the dispersed regions of optically transmissive solid material are comprised of microbeads.

7. A lighting module of claim 6 wherein the microbeads comprise PMMA or acrylic.

8. A lighting module of claim 1 wherein the light guide is further comprising surface features upon a face adjacent to the single input face.

9. A lighting module of claim 8 in which the light guide surface features adjusts the symmetry of the angular output versus a light guide equivalent in bulk material and dispersed regions without surface features.

10. A lighting module of claim 8 wherein the light guide has surface features on the light guide outer face.

11. A lighting module of claim 8 wherein the light guide has surface features on the light guide inner face.

12. A lighting module of claim 8 in which the surface features comprise a full or partial geometric shape of a sphere, paraboloid, ellipsoid, polyhedron, or polyhedron frustum.

13. A lighting module of claim 8 wherein the surface features re-direct light.

14. A lighting module of claim 8 in which the surface features are arranged in a pattern.

15. A lighting module of claim 14 in which the surface features comprise a lenticular pattern.

16. A lighting module of claim 8 wherein the pattern includes flat areas of no surface features.

17. A lighting module of claim 14 in which the surface feature pattern is comprised of a specific cross-sectional shape comprising a full or partial geometric form of a polygon, truncated polygon, concave polygon, convex polygon, parabola, ellipse, sphere, or arc.

18. A lighting module of claim 8 wherein the presence of surface features on either the inner face or the outer face of the light guide is selectively chosen by orientation of the light guide with respect to the first reflective surface.

19. The lighting module of claim 18 wherein when the surface features are on the inner face of the light guide the light distribution is divided by the optical axis normal to the outer face into two portions of substantially equal integrated intensity over angle and when the surface features are on the outer face of the light guide the light distribution is divided by the optical axis normal to the outer face into two portions of substantially unequal integrated intensity over angle.

20. The lighting module of claim 1 further comprising dispersed additives to the optically transmissive bulk material that reduce smoothness or gloss of the light guide inner face or outer face.

21. A lighting module of claim 1 wherein the light guide is fabricated using an extrusion, casting, or injection molding process.

22. A lighting module of claim 1 wherein the first and second reflective surfaces are regions of a single reflector that wraps around 2 or more faces of the light guide.

23. The lighting module of claim 1 wherein the first reflective surface or second reflective surface produce specular reflectance of incident light.

24. The lighting module of claim 1 wherein the first reflective surface or second reflective surface produce diffuse reflectance of incident light.

25. A lighting module of claim 1 wherein the two lobes of the bi-lobed light distribution are of substantially similar peak intensity.

26. A lighting module of claim 1 wherein the two lobes of the bi-lobed light distribution are of substantially similar shape.

27. A lighting module of claim 1 wherein the two lobes of the bi-lobed light distribution are of a substantially similar angle of tilt relative to the outer face of the lighting module.

28. A lighting module of claim 1 wherein a lobe peak 1 has greater intensity than a lobe peak 2.

29. A lighting module of claim 1 wherein a lobe peak 1 has a greater angle of tilt with respect to the outer face than a lobe peak 2.

30. A lighting module of claim 1 wherein the bi-lobed light distribution has a local minimum point between the two lobed peaks of the bi-lobed distribution.

31. A lighting module of claim 1 wherein the local minimum point between the two lobed peaks of the bi-lobed distribution is on or near the axis normal to the outer face.

32. A lighting module of claim 1 wherein the local minimum point between the two lobed peaks of the bi-lobed distribution is offset from the axis normal to the outer face.

33. A lighting module of claim 1 wherein the bi-lobed light distribution is divided by the optical axis normal to the outer face into two portions of substantially equal integrated intensity over angle.

34. A lighting module of claim 1 wherein the bi-lobed light distribution is divided by the optical axis normal to the outer face into two portions of substantially unequal integrated intensity over angle.

35. A lighting module of claim 1 wherein either the inner face or outer face is perpendicular to the input face.

36. A lighting module of claim 1 wherein the either the inner face or outer face is perpendicular to the opposing face.

37. A lighting module of claim 1 further comprising an optically transmitting component positioned near the outer face wherein the optically transmitting component is the output face of a light fixture.

38. A lighting module of claim 37 wherein the optically transmitting component is a cover lens.

39. A lighting module of claim 37 wherein the optically transmitting component is a glare control film.

40. A lighting module of claim 37 wherein the optically transmitting component modifies a lighting distribution output of the lighting module.

41. A lighting module of claim 40 wherein a lighting distribution from the output face of the light fixture is narrower than without the optically transmitting component.

42. A lighting module of claim 40 wherein a lighting distribution from the output face of the light fixture is rounder than without the optically transmitting component.

43. A lighting module of claim 1 wherein the lighting module housing is configured to hold the light source, light guide, first reflective surface, and second reflective surface in alignment.

44. A lighting module of claim 1 wherein the three-dimensional form of the linear module housing is that of a two-dimensional cross-sectional profile area linearly extruded in a perpendicular direction.

45. A lighting module of claim 44 wherein the lighting module housing is produced by profile extrusion.

46. The lighting module of claim 1 wherein the lighting module housing is inserted into a light fixture housing by a process comprising flexing of side wall portions of the lighting module housing.

47. The lighting module of claim 1 wherein the lighting module is removable.

48. A lighting module of claim 1 wherein the lighting module is removed from a light fixture housing by a process comprising flexing of side wall portions of the lighting module housing.

49. A lighting module of claim 1 wherein the lighting module housing comprises a side wall portion and a supporting ledge that is an orthogonal extension of the side wall portion; wherein the supporting ledge supports the light guide and holds an LED board in a position in alignment with the single input face.

50. A light fixture comprising;
a) a light fixture housing;
b) a lighting module comprising;
 i) a lighting module housing
 ii) a light guide comprising
  a) an optically transmissive material comprising dispersed regions of optically transmissive solid material within a bulk matrix material wherein a refractive index of the dispersed regions is different than a refractive index of the bulk matrix material,
  b) a single input face,
  c) an opposing face non-adjacent to the single input face,
  d) an inner face adjacent to the single input face,
  e) an outer face adjacent to the single input face;
 iii) a light source inputting light into the single input face of the light guide;
 iv) a first reflective surface positioned external of the light guide and proximate to the light guide inner face wherein light exiting the light guide inner face is reflected back into the light guide from the first reflective surface; and
 v) a second reflective surface positioned external of the light guide and proximate to the light guide opposing face wherein light exiting the light guide opposing face is reflected from the second reflective surface;
wherein the light output from the light fixture is a bi-lobed light distribution exiting from the outer face wherein each lobe is oriented in a non-normal direction to an output face of the fixture and at least one lobe has a greater peak intensity than the intensity at the normal.

51. The light fixture of claim 50 wherein the light fixture housing incorporates the lighting module housing.

52. The light fixture of claim 50 wherein the lighting module is oriented to produce mostly downlight.

53. The light fixture of claim 50 wherein the lighting module is oriented to produce mostly uplight.

54. The light fixture of claim 50 wherein the light fixture type is selected from the group consisting of linear, suspended, and downlight.

55. A light fixture of claim 50 that is suspended by a wire from a ceiling.

56. A light fixture of claim 50 that is used to illuminate a floor or a ceiling.

57. The light fixture of claim 50 wherein the lighting module housing is connected in alignment with a light fixture housing by mating of at least one pair of linear bump and linear notch features, one of the pair being in the light module housing and one of the pair being in the light fixture housing.

58. A light fixture of claim 57 wherein the lighting module housing is disconnected from a light fixture housing by a process comprising the separation of mated linear bump and linear notch features.

59. The light fixture of claim 50 wherein the lighting module is removable.

60. A light fixture of claim 50 further comprising an optically transmitting component.

61. A light fixture of claim 50 wherein a lighting distribution from the output face of the light fixture is different to a lighting distribution from the lighting module.

62. A light fixture of claim 50 wherein the light fixture comprises two lighting modules.

63. A light fixture of claim 62 wherein one lighting module is configured as an uplight and the other lighting module is configured as a downlight.

64. A light fixture of claim 62 wherein the lighting modules can be controlled independently.

* * * * *